United States Patent
Lee

(10) Patent No.: US 10,148,711 B2
(45) Date of Patent: Dec. 4, 2018

(54) METHOD FOR PROVIDING CONTENT AND ELECTRONIC DEVICE THEREOF

(71) Applicant: Samsung Electronics Co., Ltd., Gyeonggi-do (KR)

(72) Inventor: Jae-Hwan Lee, Incheon (KR)

(73) Assignee: Samsung Electronics Co., Ltd. (KR)

( * ) Notice: Subject to any disclaimer, the term of this patent is extended or adjusted under 35 U.S.C. 154(b) by 299 days.

(21) Appl. No.: 14/919,291

(22) Filed: Oct. 21, 2015

(65) Prior Publication Data
US 2016/0112474 A1    Apr. 21, 2016

(30) Foreign Application Priority Data

Oct. 21, 2014    (KR) .................. 10-2014-0142758

(51) Int. Cl.
*G06F 3/048* (2013.01)
*H04L 29/06* (2006.01)
*H04M 1/725* (2006.01)
*H04M 1/2745* (2006.01)

(52) U.S. Cl.
CPC ...... *H04L 65/403* (2013.01); *H04M 1/72519* (2013.01); *H04M 1/72522* (2013.01); *H04M 1/274508* (2013.01); *H04M 2250/64* (2013.01)

(58) Field of Classification Search
None
See application file for complete search history.

(56) References Cited

U.S. PATENT DOCUMENTS

| | | | |
|---|---|---|---|
| 2012/0290968 A1* | 11/2012 | Cecora | G06F 17/30864 715/780 |
| 2013/0332870 A1* | 12/2013 | Kim | G06F 3/0481 715/766 |
| 2015/0312184 A1* | 10/2015 | Langholz | H04L 51/04 715/753 |

FOREIGN PATENT DOCUMENTS

KR    10-2008-0023008    3/2008

* cited by examiner

*Primary Examiner* — Thanh Vu
(74) *Attorney, Agent, or Firm* — The Farrell Law Firm, P.C.

(57) ABSTRACT

A method of providing a content in an electronic device is provided. The method includes include detecting a mapping event associated with a content of the electronic device, in response to detecting the mapping event, confirming the content, determining a contact point for mapping the content, and mapping the content to the contact point for mapping.

19 Claims, 21 Drawing Sheets

METHOD FOR PROVIDING CONTENT AND ELECTRONIC DEVICE THEREOF

PRIORITY

This application claims priority under 35 U.S.C. § 119(a) to a Korean Patent Application filed in the Korean Intellectual Property Office on Oct. 21, 2014, and assigned Serial No. 10-2014-0142758, the entire contents of which are incorporated herein by reference.

BACKGROUND

1. Field of the Disclosure

The present disclosure relates generally to a method and an apparatus for providing a content.

2. Description of the Related Art

Electronic devices for performing one or more functions in a complex manner have increased in recent years. An electronic device, such as a mobile terminal, has a touch-type display module with a large-sized screen, and has a high-definition camera module to capture a still picture and a moving picture. In addition, an electronic device provides typical functions, such as communication with another party, and accessing a network to perform web surfing. Such electronic devices have gradually evolved to employ a highly effective processor, thereby being able to perform various functions.

SUMMARY

The present disclosure has been made to address at least the problems and disadvantages described above, and to provide at least the advantages described below.

Accordingly, an aspect of the present disclosure is to efficiently share various types of content between electronic devices.

In accordance with an aspect of the present disclosure, a method of operating an electronic device is provided. The method includes detecting a mapping event associated with a content of the electronic device, in response to detecting the mapping event, confirming the content, determining a contact point for mapping the content, and mapping the content to the contact point for mapping.

In accordance with another aspect of the present disclosure, an electronic device is provided. The electronic device includes a display and a processor. The processor is configured to control to detect a mapping event associated with a content of the electronic device, in response to detecting the mapping event, confirm the content, determine a contact point for mapping the content, and map the content to the contact point.

In accordance with another aspect of the present disclosure, a non-transitory computer-readable storage medium storing instructions of a program is provided. The program executes a method of detecting a mapping event associated with a content of an electronic device, in response to detecting the mapping event, confirming the content, determining a contact point for mapping the content, and mapping the content to the contact point.

BRIEF DESCRIPTION OF THE DRAWINGS

The above and other aspects, features and advantages of the present disclosure will be more apparent from the following detailed description, taken in conjunction with the accompanying drawings, in which.

DETAILED DESCRIPTION

Figure 1:
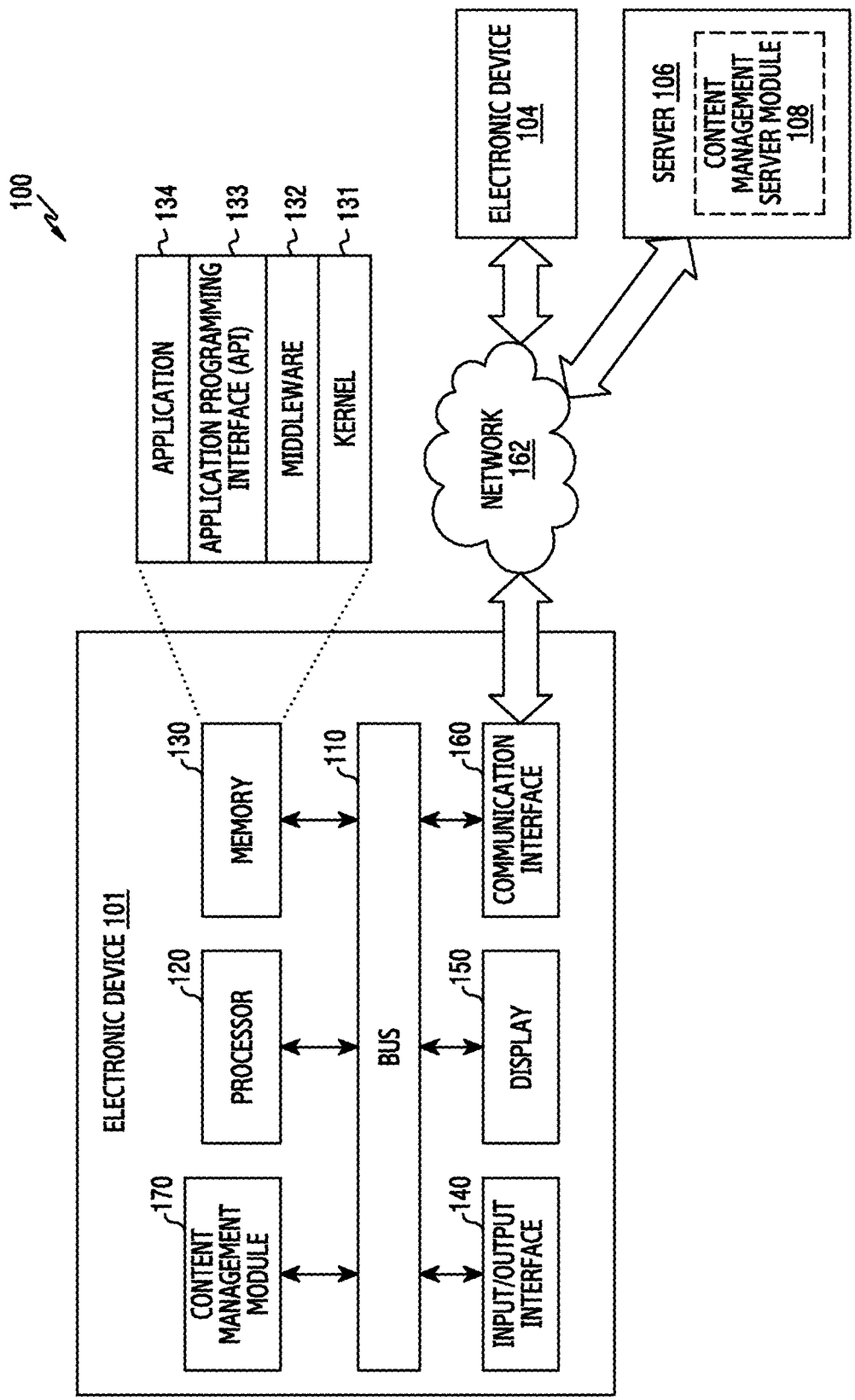
FIG. 1 is a block diagram of a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding. However, these are to be regarded merely as examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustrative purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

The terms "include" and "may include" refer to the existence of a corresponding disclosed function, operation, element, or component do not limit one or more additional functions, operations, elements, or components. Further, as used herein, the terms "include", "have" and their conjugates may be construed to denote a certain characteristic, number, step, operation, constituent element, component or a combination thereof, but should not be construed to exclude the existence of or a possibility of an addition of one or more other characteristics, numbers, steps, operations, constituent elements, components or combinations thereof.

As used herein, the expressions "or" and "at least one of A or/and B" include any or all combinations of words listed together. For example, the expressions "A or B" and "at least A or/and B" may include A, may include B, or may include both A and B.

The expressions "1", "2", "first", "second", or the like, used herein, may modify various components, but do not limit the corresponding components. For example, the above expressions do not limit the sequence and/or importance of the corresponding elements. The above expressions may be used merely for the purpose of distinguishing one element from the other elements. For example, a first electronic device and a second electronic device indicate different electronic devices although both of them are electronic devices. For example, without departing from the scope of the present disclosure, a first component element may be referred to as a second component element. Similarly, the second component element also may be referred to as the first component element.

When an element is referred to as being "coupled" or "connected" to any other element, it should be understood that not only may the element be directly coupled or connected to the other element, but also a third element may be interposed between the two elements. On the contrary, when an element is referred to as being "directly coupled" or "directly connected" to any other element, it should be understood that no element is interposed between the two elements.

Unless defined differently, all terms used herein, which include technical or scientific terms, have the same meaning as would be understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to various embodiments of the present disclosure may be a device having a camera function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch).

According to various embodiments of the present disclosure, the electronic device may be a smart home appliance with a camera function. The smart home appliance as an example of the electronic device may include at least one of a television (TV), a Digital Versatile Disc (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to various embodiments of the present disclosure, the electronic device may include at least one of various types of medical devices (for example, a Magnetic Resonance Angiography (MRA) scanner, a Magnetic Resonance Imaging (MRI) scanner, a Computed Tomography (CT) scanner, a scanning machine, an ultrasonic wave device, etc.), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass, etc.), avionics, a security device, and an industrial or home robot.

According to various embodiments of the present disclosure, the electronic device may include at least one of furniture or a part of a building/structure, an electronic board, an electronic signature receiving device, a projector, and various types of measuring devices (for example, a water meter, an electricity meter, a gas meter, a radio wave meter, etc.), including a display control function.

An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1 is a block diagram of a network environment including an electronic device according to an embodiment of the present disclosure.

Referring to FIG. 1, an electronic device 101 includes a bus 110, a processor 120, a memory 130, an input/output interface 140, a display 150, a communication interface 160, and a content management module 170. According to various embodiments of the present disclosure, the content management module 170 may operate in the processor 120, or may be included in a separate module and interoperate with the processor 120. According to various embodiments of the present disclosure, the display 150 is separated from the electronic device 101 as a separate module.

The bus 110 is a circuit that interconnects the above-described component elements and delivers communications (for example, a control message) between the above-described component elements.

The processor 120 receives an instruction from other component elements (for example, the memory 130, the input/output interface 140, the display 150, the communication interface 160, and the content management module 170), through the bus 110, decrypts the received instruction, and executes operation or data processing based on the decrypted instruction.

The memory 130 stores an instruction or data received from the processor 120 or other component elements (for example, the input/output interface 140, the display 150, the communication interface 160, and the content management module 170), or stores instructions or data generated by the processor 120 or other component elements.

The memory 130 includes programming modules, for example, a kernel 131, middleware 132, an Application Programming Interface (API) 133, and an application 134. Each of the aforementioned programming modules is formed of software, firmware, and hardware, or a combination thereof.

The kernel 131 controls or manages system resources, for example, the bus 110, the processor 120, and the memory 130, used for executing an operation or function implemented in the other programming modules, for example, the middleware 132, the API 133, or the application 134. Also, the kernel 131 provides an interface that enables the middleware 132, the API 133, and the application 134 to access an individual component element of the electronic device 101 for control or management.

The middleware 132 acts as an intermediary so that the API 133 or the application 134 executes communication with the kernel 131, and receives and transmits data. Also, in association with task requests received from the application 134, the middleware 132 executes a control (for example, scheduling or load balancing), for a task request, through use of a method of assigning, to at least one of applications 134, a priority of use of a system resource of the electronic device 101 (for example, the bus 110, the processor 120, the memory 130, etc.).

The API 133 is an interface used by the application 134 to control a function provided from the kernel 131 or the middleware 132, and includes at least one interface or function (for example, an instruction), for file control, window control, image processing, a character control, etc.

According to various embodiments of the present disclosure, the application 134 includes a Short Message Service (SMS)/Multimedia Messaging Service (MMS) application, an e-mail application, a calendar application, an alarm application, a health care application (for example, an application for measuring an amount of exercise or blood sugar), an environmental information application (for example, an application for providing atmospheric pressure, humidity information, temperature information), etc. Additionally or alternatively, the application 134 may be an application associated with exchanging information between the electronic device 101 and an external electronic device 104. The application associated with exchanging information may include, for example, a notification relay application for transferring predetermined information to an external electronic device or a device management application for managing an external electronic device.

The notification relay application includes a function of transferring, to the external electronic device 104, notification information generated from other applications of the electronic device 101 (for example, an SMS/MMS application, an e-mail application, a health management application, an environmental information application, or the like). Additionally or alternatively, the notification relay application receives notification information from, for example, an external electronic device 104, and provides the notification information to a user. For example, the device management application may manage (for example, install, delete, or update) a function of at least a part of an external electronic device 104 that communicates with the electronic device 101 (for example, turning on/off the external electronic device 104 (or a few components of the electronic device 104) or adjusting a brightness (or resolution) of a display of the external electronic device 104), an application operated in the external electronic device 104, or a service provided from the external electronic device 104 (for example, a call service or a message service).

The application 134 may include an application designated based on properties (for example, a type of an electronic device) of an external electronic device 104. For example, when the external electronic device 104 is an MP3 player, the application 134 may include an application related to the reproduction of music. Similarly, when the external electronic device 104 is a mobile medical device, the application 134 may include an application related to health care. The application 134 includes at least one of an application designated for the electronic device 101 and an application received from an external electronic device 104 or (a server 106.

The input/output interface 140 transfers an instruction or data, which is input by a user through an input/output device (for example, a sensor, a keyboard, or a touch screen), to the processor 120, the memory 130, the communication interface 160, or the content management module 170 through the bus 110. For example, the input/output interface 140 provides, to the processor 120, data associated with a touch of a user input through a touch screen. Further, the input/output interface 140 outputs, through an input/output device (for example, a speaker or display), an instruction or data received through the bus 110 from the processor 120, the memory 130, the communication interface 160, and the content management module 170. For example, the input/output interface 140 outputs voice data processed through the processor 120 to a user through a speaker.

The display 150 displays various types of information (for example, multimedia data, text data, etc.) to a user.

The communication interface 160 establishes communication between the electronic device 101 and an external electronic device 104 or a server 106. For example, the communication interface 160 may be connected to a network 162 through wireless communication or wired communication, and may communicate with an external device. The wireless communication includes at least one of Wi-Fi, Bluetooth (BT), Near Field Communication (NFC), GPS, and cellular communication (for example, Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc.). The wired communication includes at least one of a Universal Serial Bus (USB), a High Definition Multimedia Interface (HDMI), a Recommended Standard 232 (RS-232), and a Plain Old Telephone Service (POTS).

The network 162 is a telecommunication network. The telecommunication network includes at least one of a computer network, the Internet, an Internet of Things, and a telephone network. A protocol (for example, a transport layer protocol, a data link layer protocol, or a physical layer protocol) for the communication between the electronic device 101 and an external electronic device 104 may be supported by at least one of the application 134, the application programming interface 133, the middleware 132, the kernel 131, and the communication interface 160.

The server 106 may support driving of the electronic device 101 by performing operations (or functions) implemented in the electronic device 101. For example, the server 106 includes a content management server module 108 capable of supporting the content management module 170 implemented in the electronic device 101. The content management server module 108 includes at least one constituent element of the content management module 170, and may perform (e.g., replace) operations performed by the content management module 170.

The content management module 170 maps a content to a contact point stored in the electronic device 101. The content may be, for example, a video, audio, an image, a text, Internet content, application data, etc. The content may further be a combination of any of the aforementioned items. The contact point may be, for example, a phone number, a Social Networking Service (SNS) IDentification (ID), and an e-mail address of a party.

The content management module 170 controls an operation of confirming a content mapping event, determining the contact point for mapping the content, and mapping the content to the contact point.

The content management module 170 additionally controls an operation of confirming a content sharing event, displaying a list of contents mapped to the contact point, determining a content to be shared as the contact point in the content list, and sharing the determined content as the contact point. Additional information for the content management module 170 is provided with reference to FIG. 2 described below.

Figure 2:
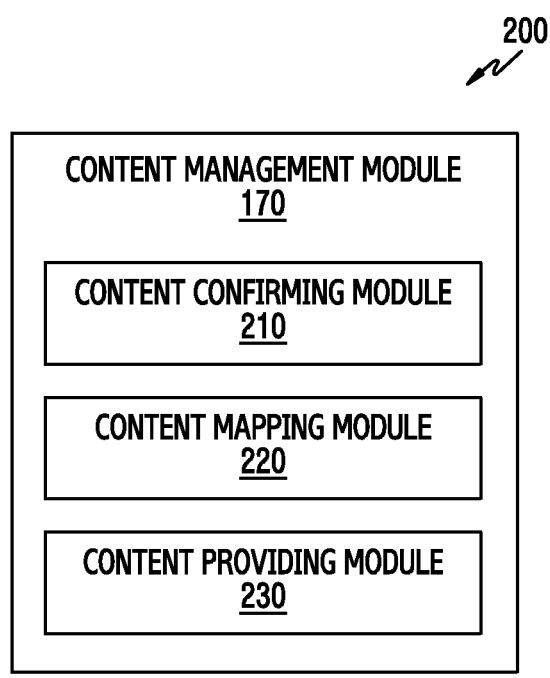
FIG. 2 is a block diagram of a content management module of an electronic device, according to an embodiment of the present disclosure.

FIG. 2 is a block diagram of a content management module of an electronic device, according to an embodiment of the present disclosure.

Referring to FIG. 2, the content management module 170 includes a content confirming module 210, a content mapping module 220, and a content providing module 230.

The content confirming module 210 confirms a content mapping event. That is, the content confirming module 210 detects a mapping event associated with a content and determines content information, including at least one of a storage location of the content, the type of the content, application information related to the content, and content providing device information.

The content mapping module 220 maps a content with a contact point. That is, the content mapping module 220 determines one or more contact points stored in the electronic device 101 to which the content should be mapped. The content mapping module stores the content, or a location of the content, in the one or more contact points.

The content providing module 230 shares a content with a party associated with a contact point. That is, the content providing module 230 detects a content sharing event associated with a contact point stored in the electronic device 101. The content providing module 230 identifies one or more contents associated with the contact point and determines one or more contents to be shared with the party associated with the contact point. The content providing module 230 provides the determined content to the party.

Figure 3:
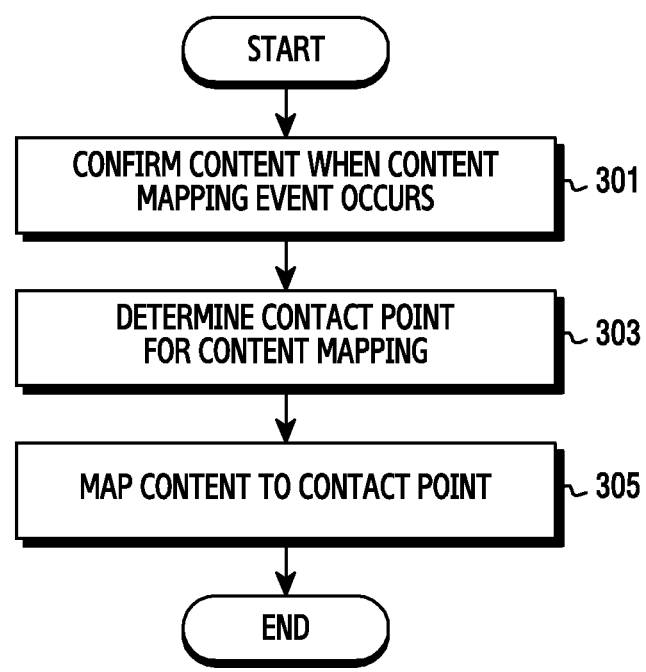
FIG. 3 is a flowchart of a procedure for mapping a content to a contact point in an electronic device, according to an embodiment of the present disclosure.
Figure 5A:
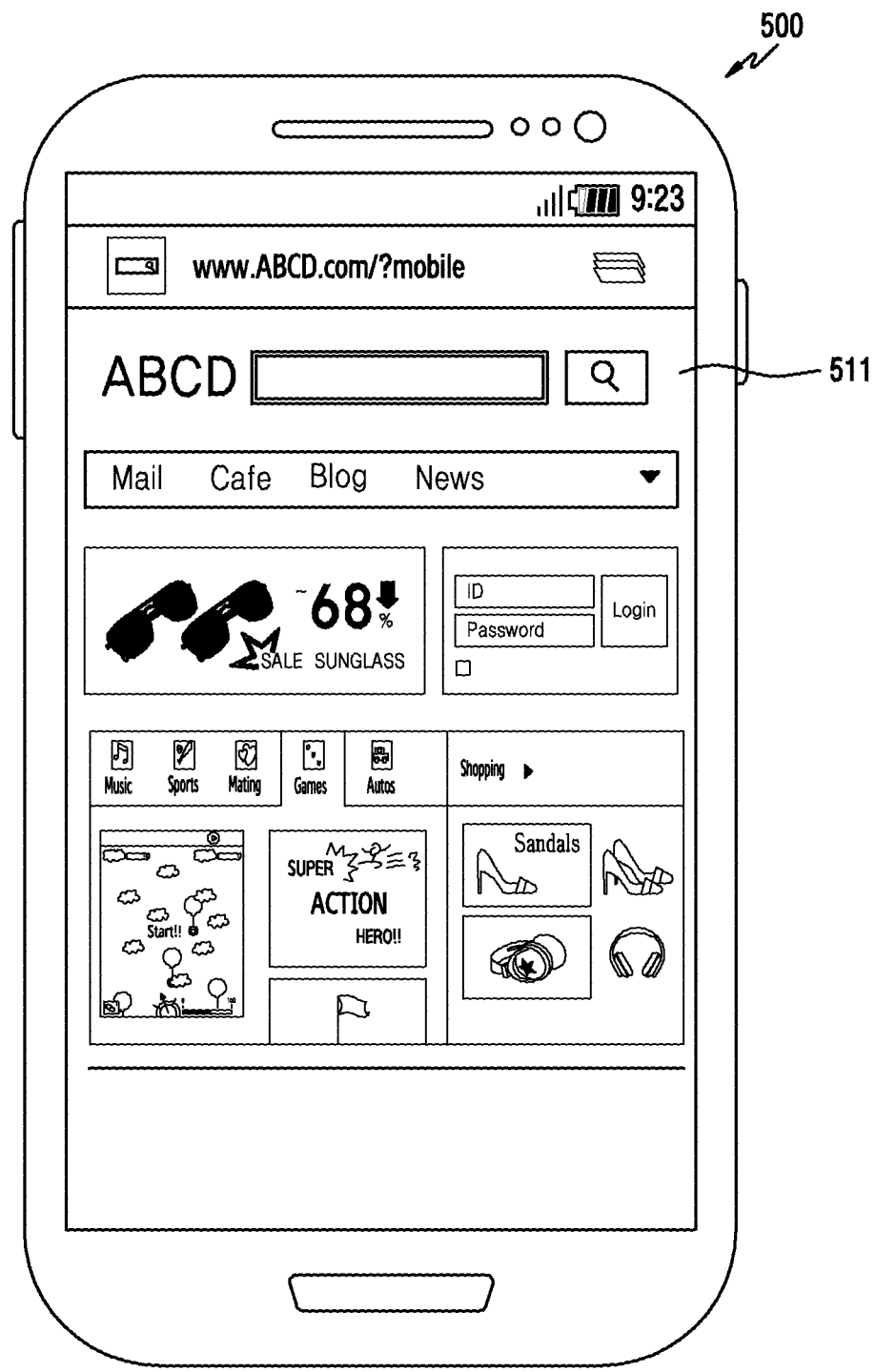
FIGS. 5A to 5E illustrate screen configurations for mapping a content to a contact point in an electronic device, according to an embodiment of the present disclosure.

FIG. 3 is a flowchart of a procedure for mapping a content to a contact point in an electronic device, according to an embodiment of the present disclosure. FIG. 5A to illustrate screen configurations for mapping a content to a contact point in an electronic device, according to an embodiment of the present disclosure.

Referring to FIG. 3, in operation 301, the electronic device 500 detects a content mapping event and confirms the content to be mapped.

Figure 5B:
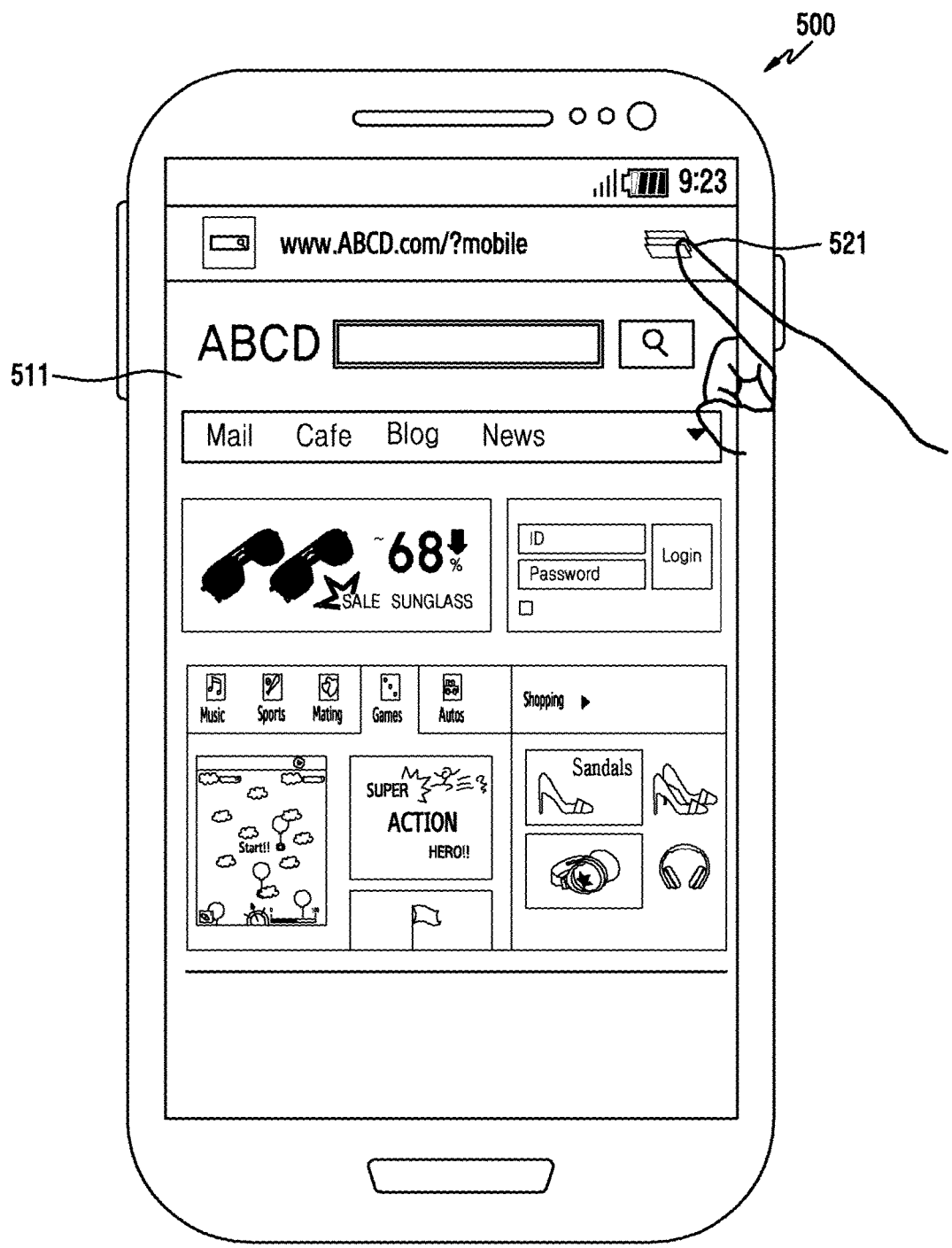

Referring to FIGS. 5A and 5B, an operation for detecting a mapping event associated with a content of the electronic device 500 is provided. For example, as shown in FIG. 5A, Internet content 511, i.e. content from an Internet page, is displayed in electronic device 500. The content confirming module 210 of the electronic device 500 detects a mapping event associated with the Internet content 511 when, as shown in FIG. 5B, a mapping menu 521 for the Internet content 511 is selected by a user. In this case, the content confirming module 210 of the electronic device 500 confirms content information including at least one of a storage location (e.g., the memory 130 or the server 106) of the Internet content 511, a type of the content (e.g., a video, an image, a text, audio, etc.), application information (e.g., Internet browser application) for providing or displaying the content, and content providing device information (e.g., an electronic device, an external electronic device connected to the electronic device). For example, the content confirming module 210 of the electronic device 500 may confirm that a location at which the Internet content 511 is stored is the memory 130 of the electronic device 500, the type of the Internet content 511 is a combination of an image and a text, and the Internet content 511 is provided through the Internet browser application.

In operation 303, the electronic device determines a contact point for content mapping.

Figure 5C:
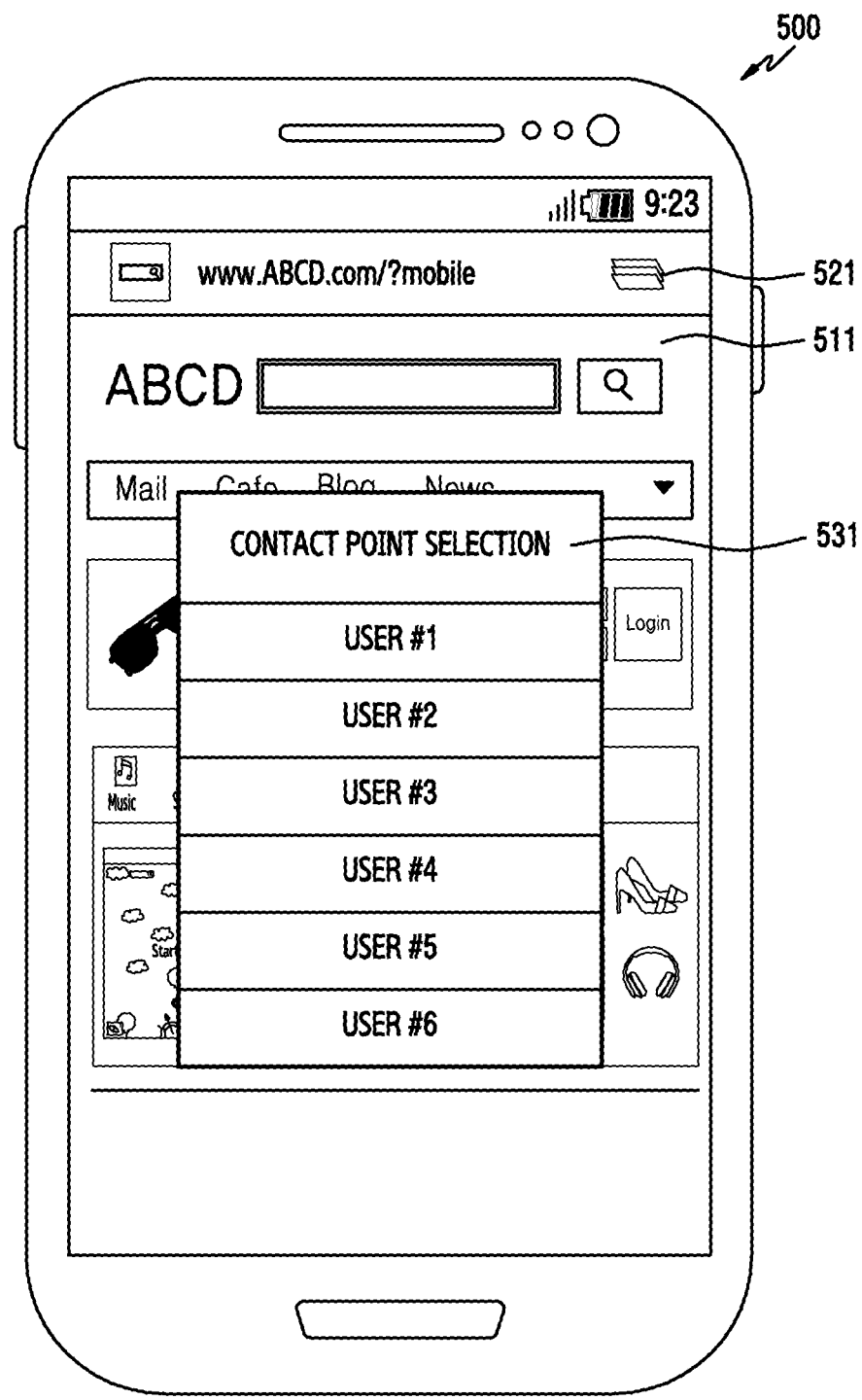
Figure 5D:
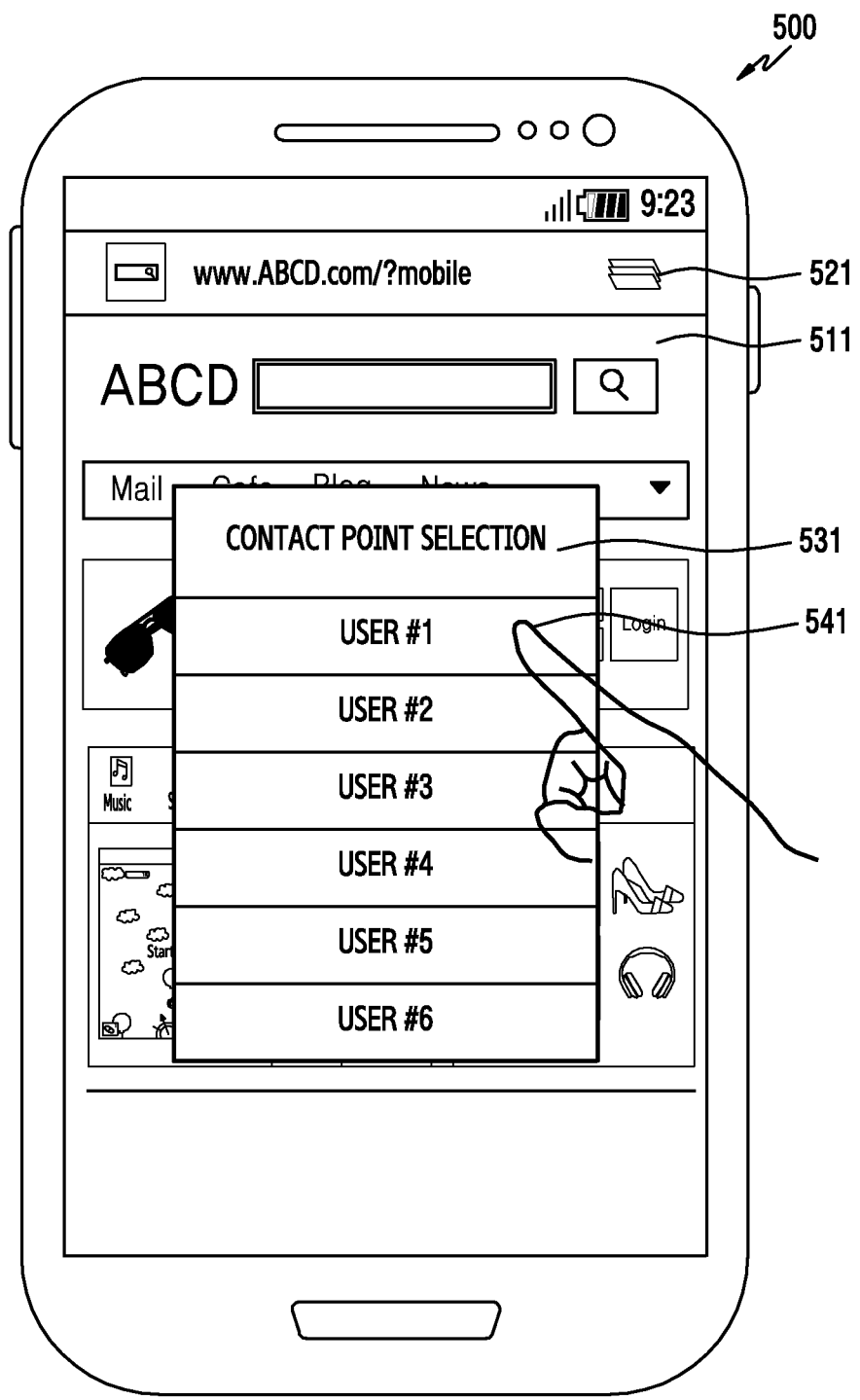

Referring to FIGS. 5C and 5D, an operation for determining a contact point in electronic device 500 for mapping the content to is provided. For example, as shown in FIG. 5C, the content mapping module 220 of the an electronic device 500 displays a contact list 531 stored in the memory 130 of the electronic device 500 or in the server 106, for the content mapping of Internet content 511. The contact list for the content mapping may vary based on the application which is providing the content. As shown in FIG. 5D, the content mapping module 220 of the electronic device 500 determines a contact point 541 selected by a user as the contact point for mapping the Internet content 511. The content mapping module 220 of the electronic device 500 may determine a plurality of contact points selected by the user as a contact point for mapping a content.

Figure 5E:
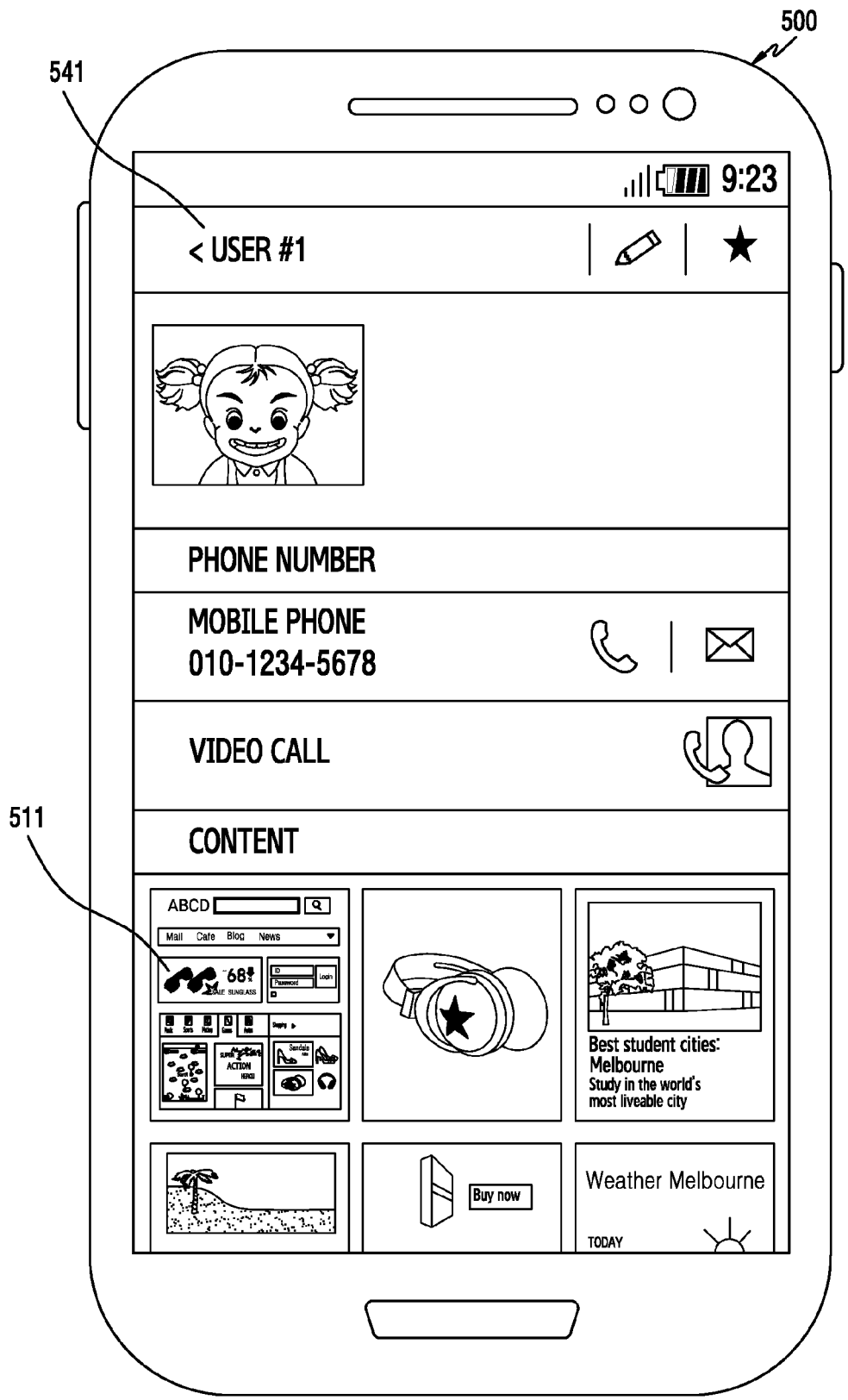

In operation 305, the electronic device maps the content to the contact point. Referring to FIG. 5E, an operation for mapping the content to a selected contact point is provided. For example, as shown in FIG. 5E, content mapping module 220 of the electronic device 500 stores Internet content 511 in at least some portions of contact point 541 selected by the user. The content stored in the contact point displays an image captured to distinguish the content from previously stored contents. The content stored in the contact point may be the content itself, or may include location information (e.g., a path of a memory in which the content is stored, or a URL at which the content is stored) for storing the content.

Figure 4:
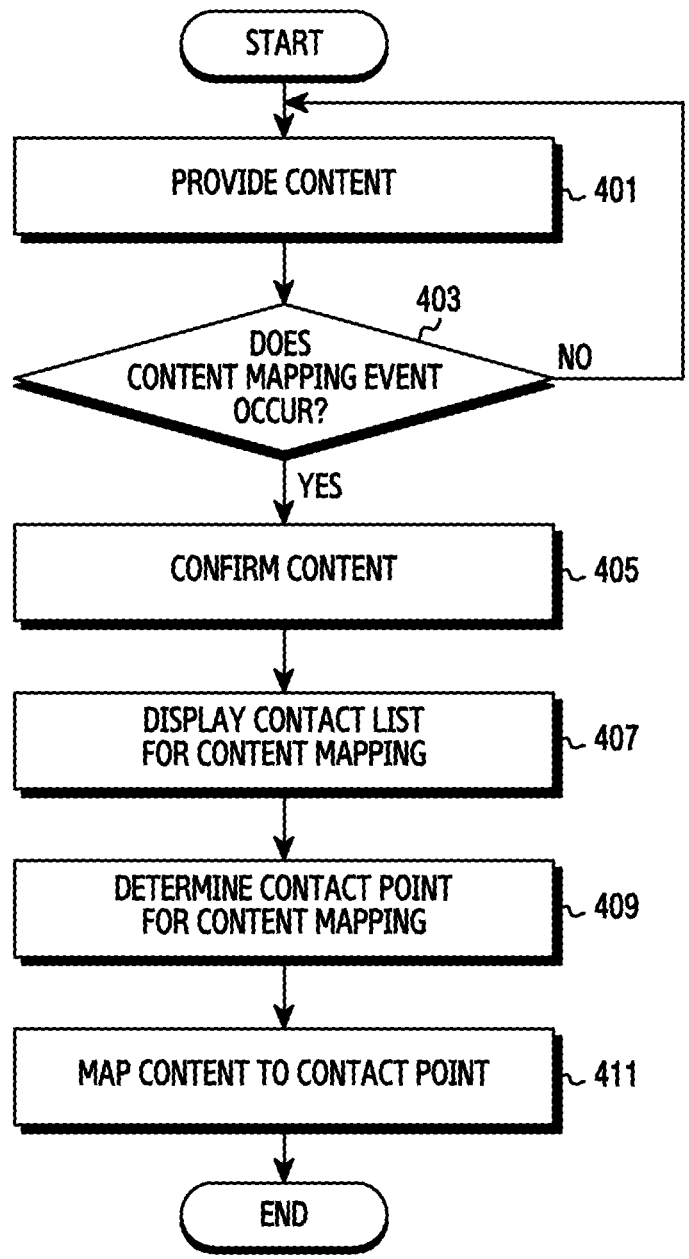
FIG. 4 is a flowchart of a procedure for mapping a content to a contact point in an electronic device, according to an embodiment of the present disclosure.

FIG. 4 is a flowchart of a procedure for mapping a content to a contact point in an electronic device, according to an embodiment of the present disclosure. Referring to FIG. 4, in operation 401, the electronic device provides or displays a content. For example, as shown in FIG. 5A, an electronic device 500 provides an Internet content 511.

In operation 403, the electronic device determines whether a content mapping event occurs. For example, as shown in FIG. 5B, the electronic device 500 determines whether a mapping event for an Internet content 511 by a user occurs.

If the content mapping event does not occur, the electronic device returns to operation 401 and determines whether the content mapping event occurs within pre-determined time intervals during which the content is provided.

If the content mapping event occurs, the electronic device confirms the content in operation 405. For example, as shown in FIG. 5B, if a mapping menu 521 for the Internet content 511 is selected by the user, the electronic device 500 confirms content information, including at least one of a storage location (e.g., the memory 130 of the electronic device 500 or the server 106) of the Internet content 511, a type of the content (e.g., a video, an image, a text, an audio, etc.), application information (e.g., Internet browser application) for providing the content, and content providing device information (e.g., an electronic device, an external electronic device connected to the electronic device). For example, the electronic device 500 may confirm that the location at which the Internet content 511 is stored is the memory 130 of the electronic device 500, the type of Internet content 511 is a combination of an image and a text, and the Internet content 511 is provided through the Internet browser application.

In operation 407, the electronic device displays a contact list for content mapping. For example, as shown in FIG. 5C, electronic device 500 displays a contact list 531 stored in the memory 130 of the electronic device 500 or the server 106 for the content mapping. The contact list for the content mapping may vary based on the application which is providing the content.

In operation 409, the electronic device determines a contact point for content mapping. For example, as shown in FIG. 5D, electronic device 500 determines a content point 541 selected by a user as a contact point for mapping Internet content 511. The electronic device 500 may determine a plurality of contact points selected by the user as a contact point for mapping a content.

In operation 411, the electronic device maps the content to the selected contact point. For example, as shown in FIG. 5E, electronic device 500 stores an Internet content 511 in at least some portions of a contact point 541 selected by the user. The content stored in the contact point displays an image captured to distinguish the content from previously stored contents. The content stored in the contact point may be the content itself, or may include location information (e.g., a path of a memory in which the content is stored, or a URL at which the content is stored) for storing the content.

Figure 6:
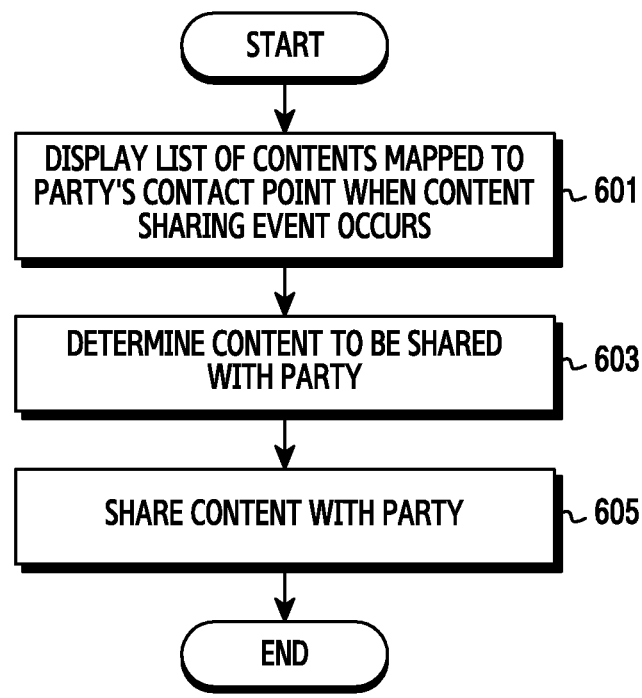
FIG. 6 is a flowchart of a procedure for sharing a content mapped to a contact point in an electronic device, according to an embodiment of the present disclosure.

FIG. 6 is a flowchart of a procedure for sharing a content mapped to a contact point in an electronic device, according to an embodiment of the present disclosure. FIGS. 8A to 8E illustrate screen configurations for sharing a content mapped to a contact point in an electronic device, according to an embodiment of the present disclosure.

Figure 8A:
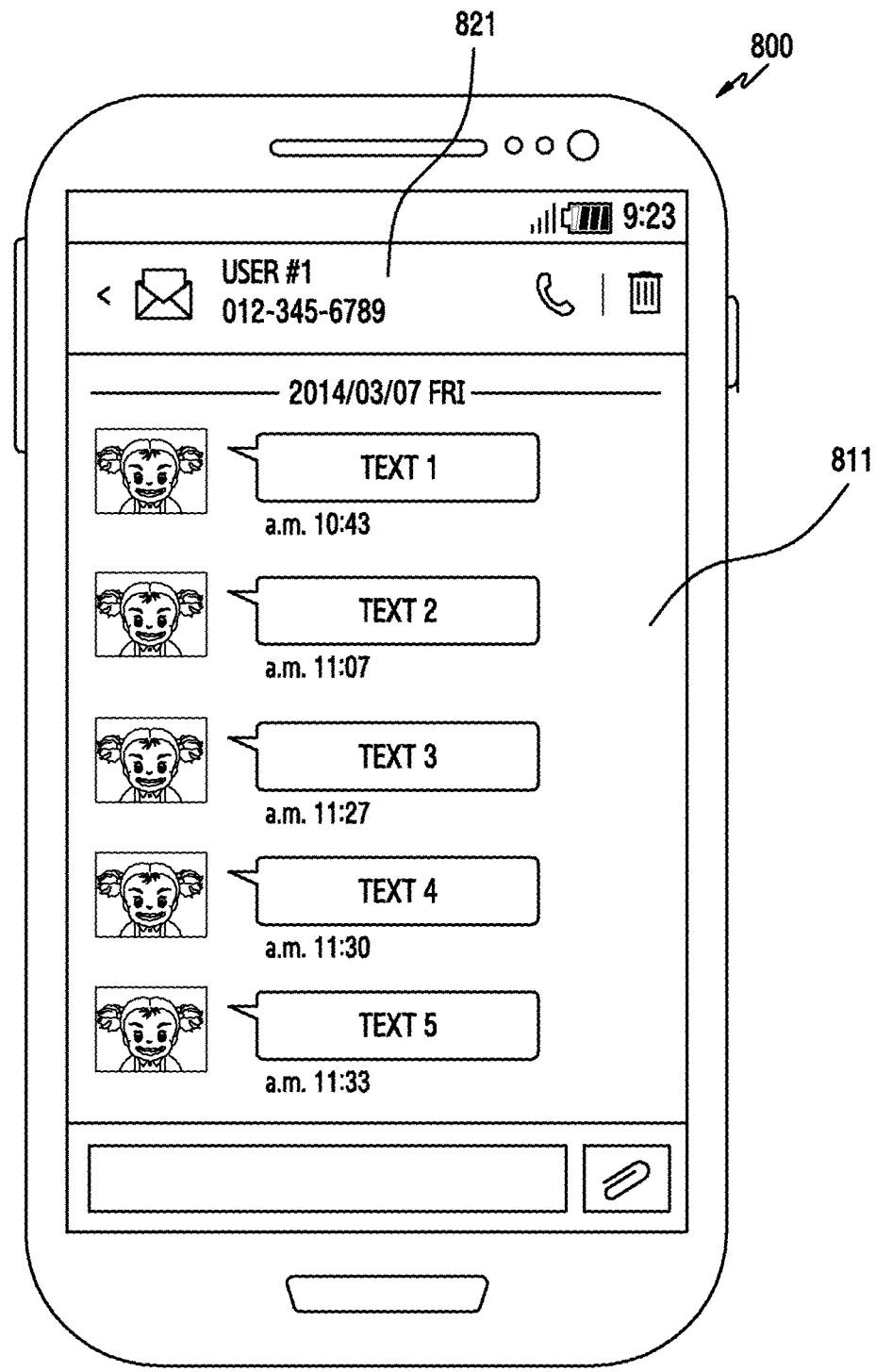
FIGS. 8A to 8E illustrate screen configurations for sharing a content mapped to a contact point in an electronic device, according to an embodiment of the present disclosure.
Figure 8B:
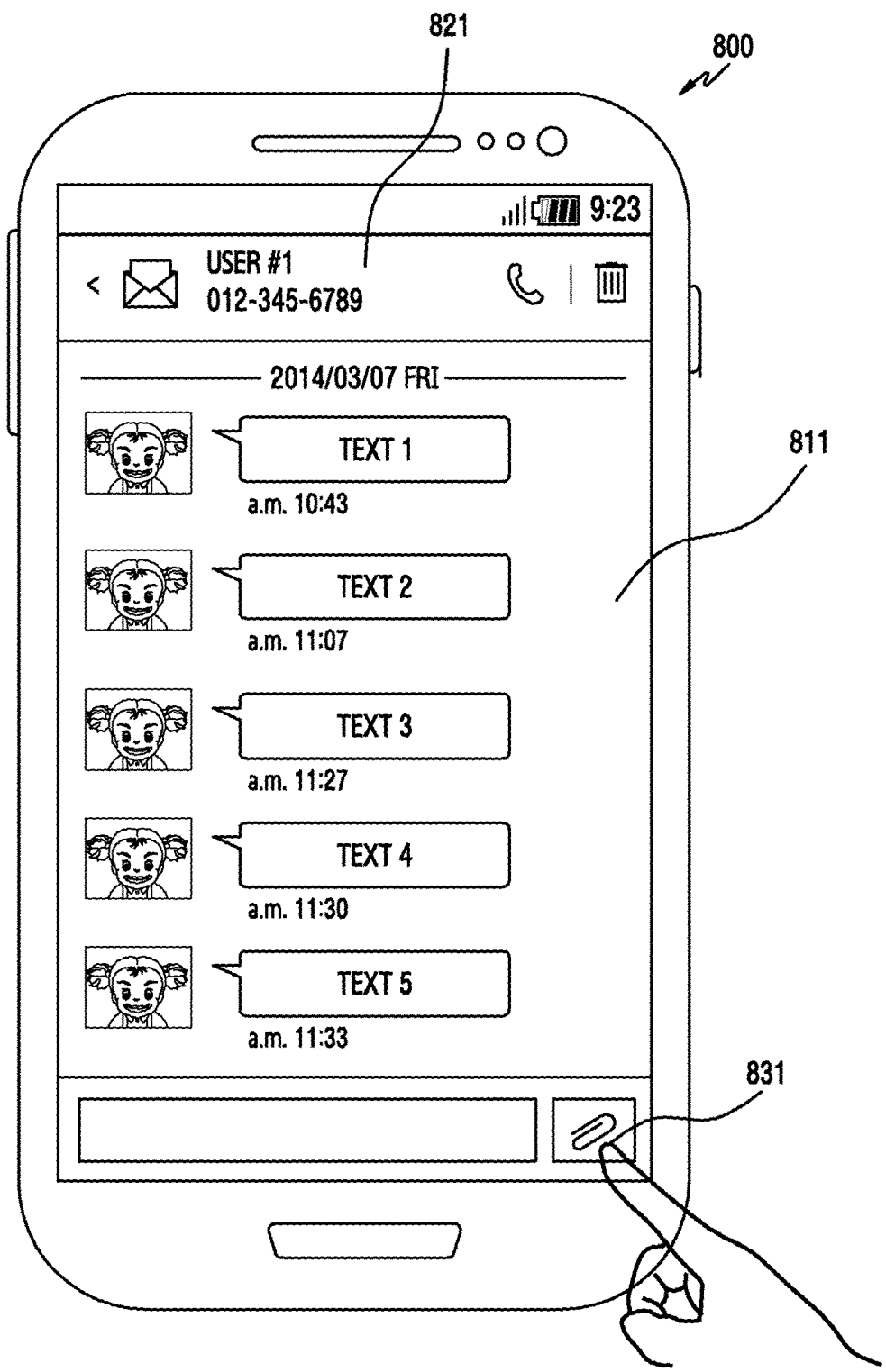
Figure 8C:
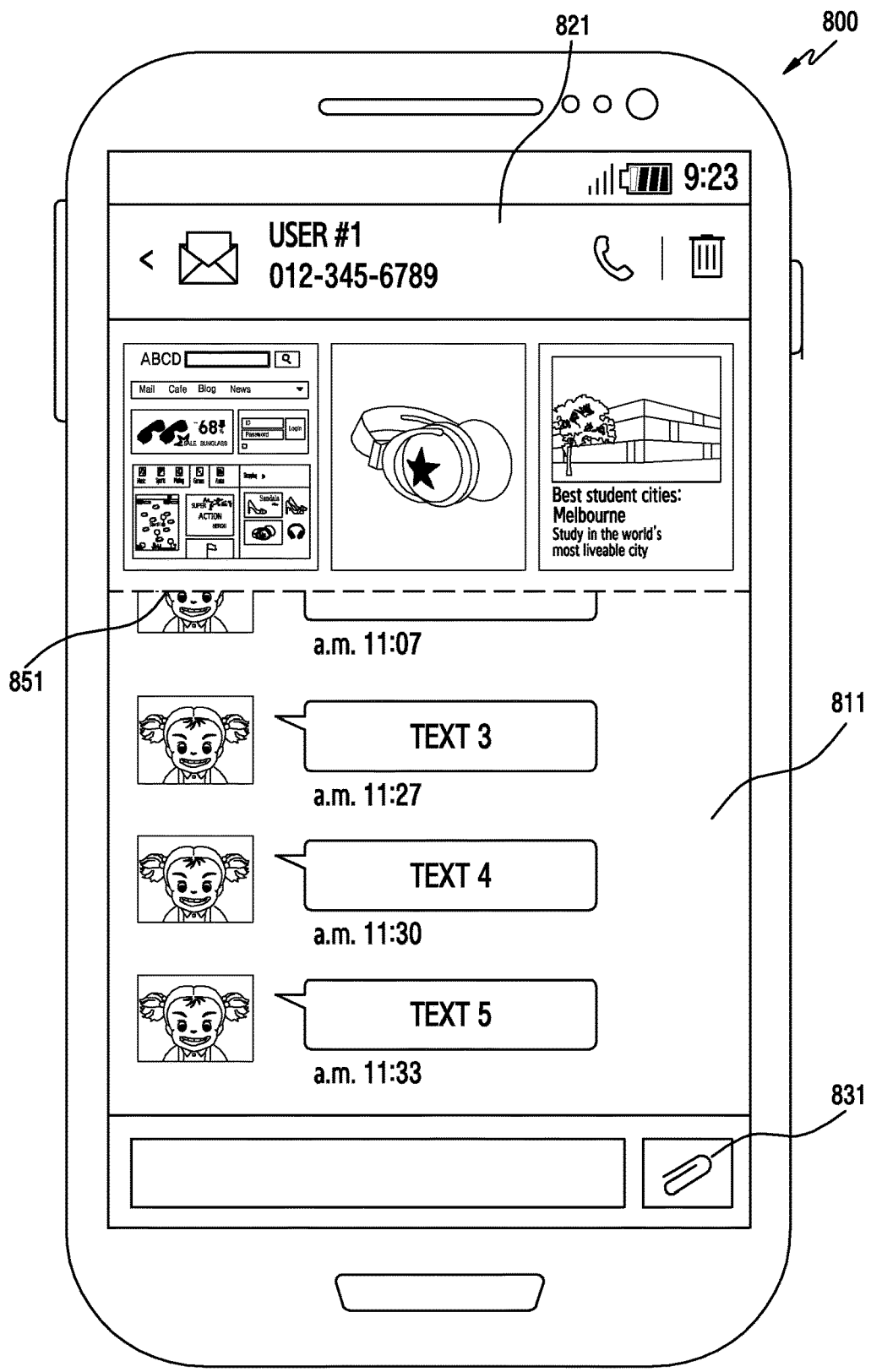

Referring to FIG. 6, in operation 601, the electronic device detects a content sharing event, and displays a list of contents mapped to a party's contact point. Referring to FIGS. 8A to 8C, an operation for displaying a list of content to share with a party is provided. For example, as shown in FIG. 8A, an electronic device 800 executes a messenger application 811. The message application 811 displays communication between the electronic device 800 and party 821 associated with a contact point stored in the electronic device 800. As shown in FIG. 8B, the content providing module 230 of the electronic device 800 determines whether a menu 831 for sharing a content in the messenger application 811 is selected. The content mapped to the contact point associated with party 821 is content stored in the memory 130 of the electronic device 800 or the server 106. If the menu 831 for sharing the content is selected by a user in the messenger application 811, the content providing module 230 of the electronic device 800 displays a list of contents 851 mapped to the contact point for party 821. The content providing module 230 of the electronic device 800 may sort the content list 851 on the basis of a time at which the content is mapped. Alternatively or additionally, the content providing module 230 of the electronic device 800 may display the content list 851 by grouping the content by content type (e.g., a video, an image, a text, an audio, etc.).

Figure 8D:
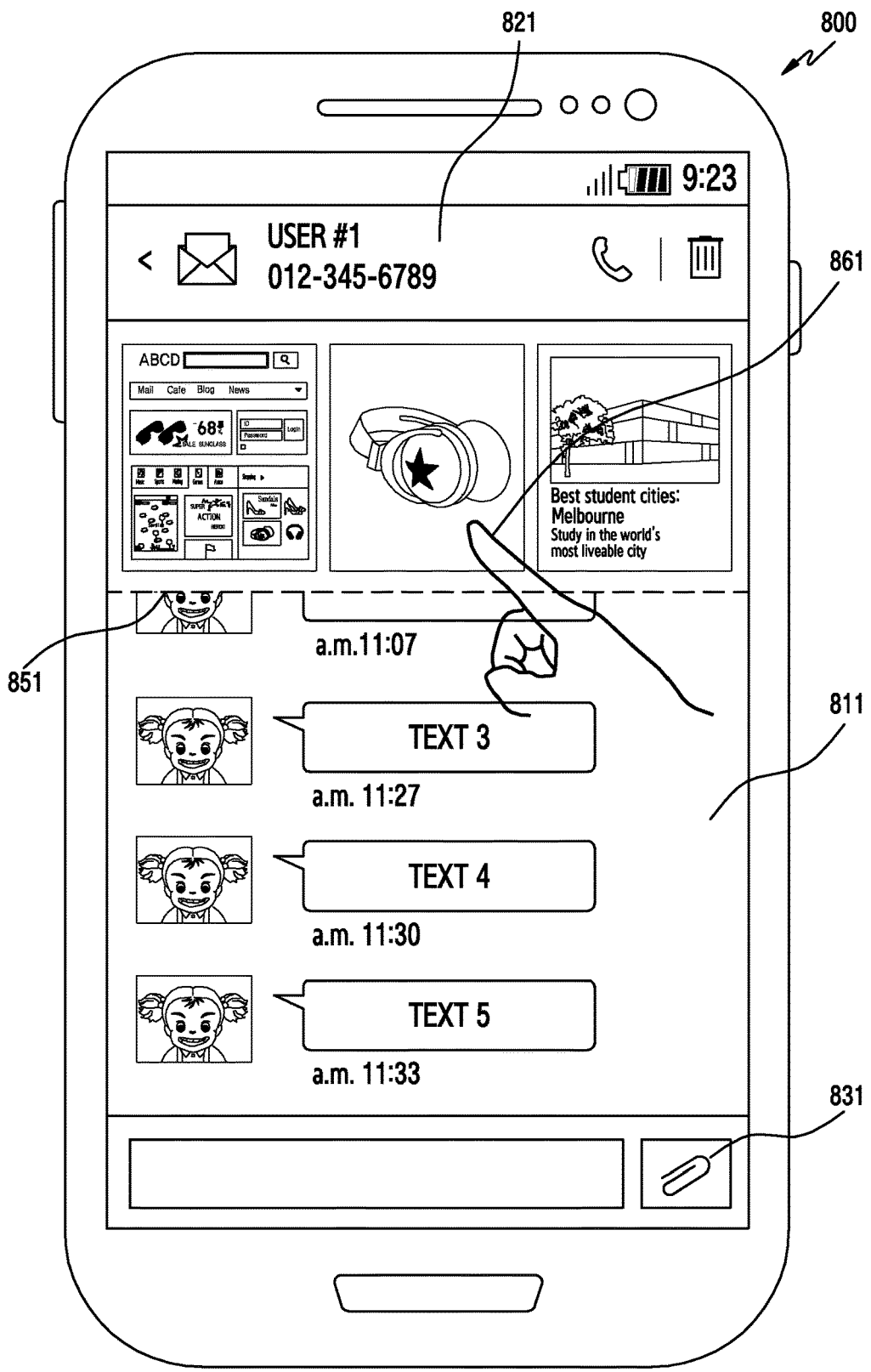

In operation 603, the electronic device determines a content to be shared with the party. Referring to FIG. 8D, an operation for determining a content to share with a party is provided. As shown in FIG. 8D, the content providing module 230 of the electronic device 800 determines a content 861 selected by the user as the content to be shared with party 821. The content providing module 230 of the electronic device 800 may determine a plurality of contents selected by the user as the content to be shared with the party 821.

Figure 8E:
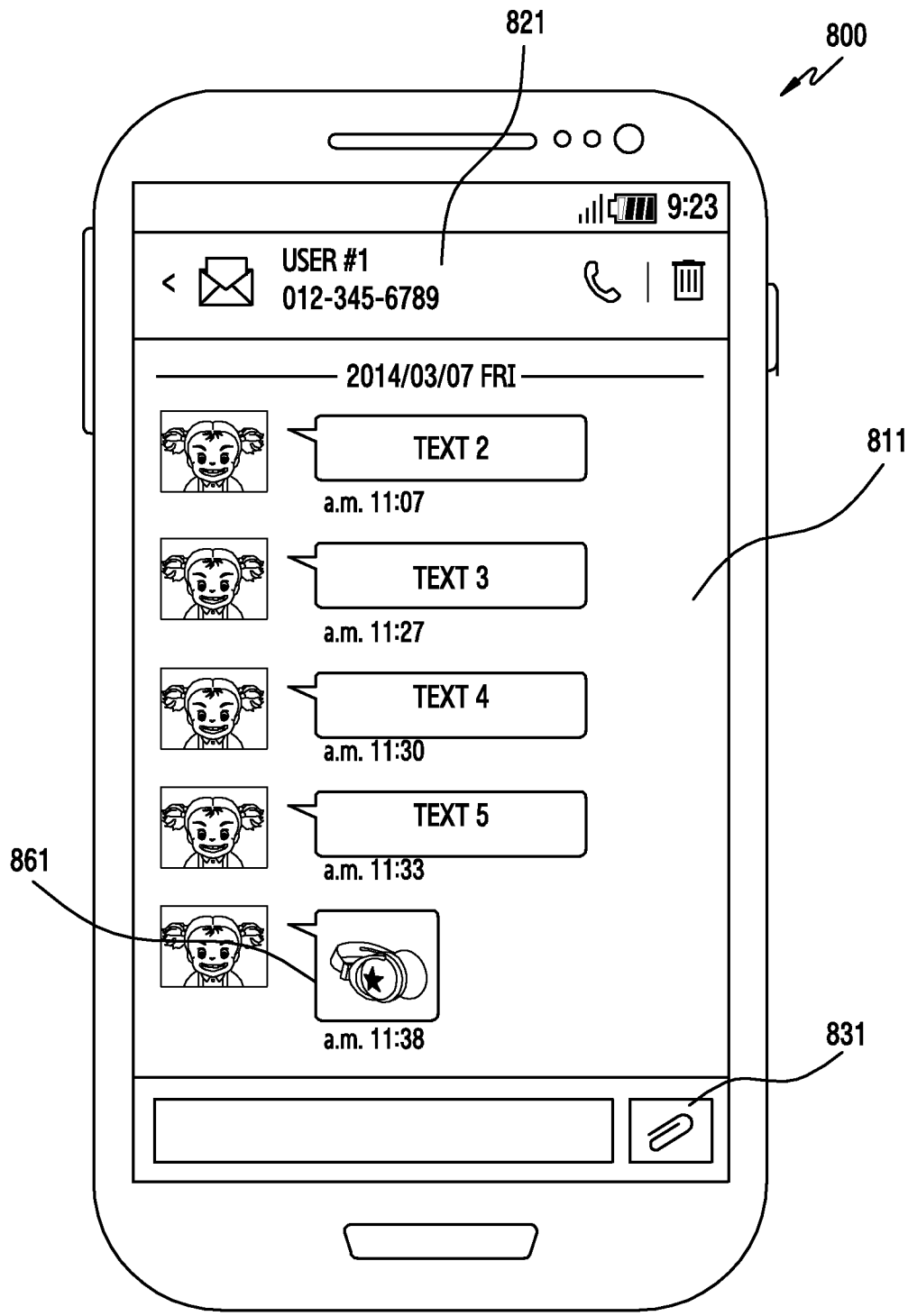

In operation 605, the electronic device shares the content with the party. Referring to FIG. 8E, an operation for sharing the content with the party is provided. For example, as shown in FIG. 8E, the content providing module 230 of the electronic device 800 provides content 861 selected by the user to party 821.

Figure 7:
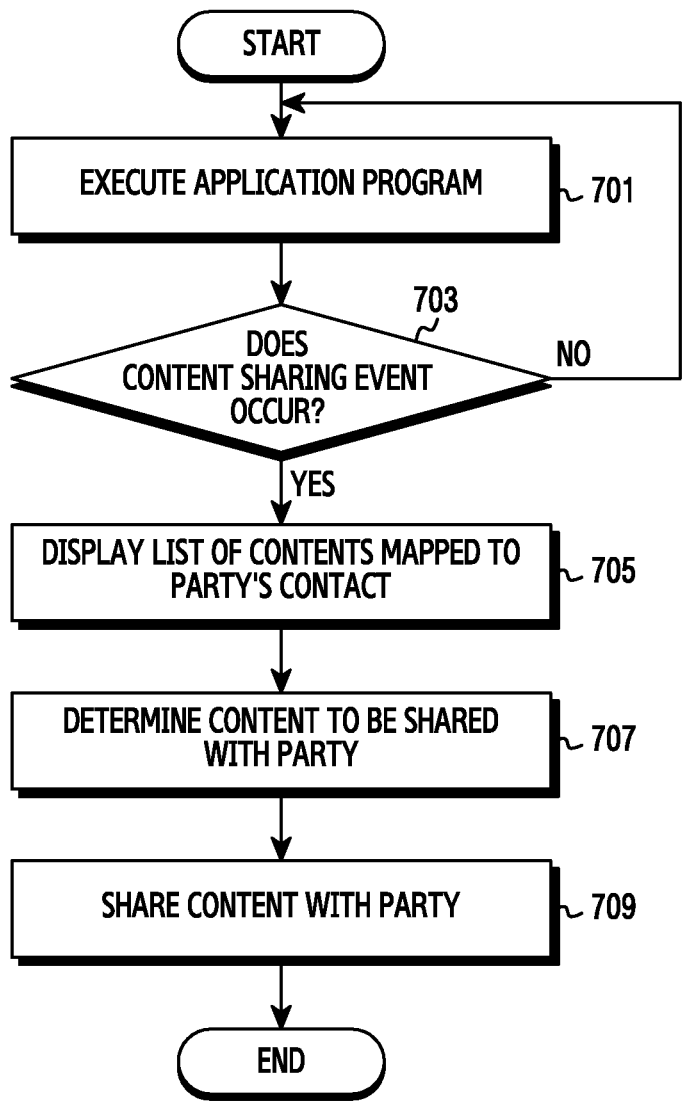
FIG. 7 is a flowchart of a procedure for sharing a content mapped to a contact point in an electronic device, according to an embodiment of the present disclosure.

FIG. 7 is a flowchart of a procedure for sharing a content mapped to a contact point in an electronic device, according to an embodiment of the present disclosure. Referring to FIG. 7, in operation 701, the electronic device executes an application program. For example, as shown in FIG. 8A, an electronic device 800 executes a messenger application 811.

In operation 703, the electronic device determines whether a content sharing event occurs. For example, as shown in FIG. 8B, an electronic device 800 determines whether a menu 831 for content sharing with a party 821 is selected in a messenger application 811 currently being executed.

If the content sharing event does not occur, the electronic device returns to operation 701 and determines whether the content sharing event occurs within pre-determined time intervals during which the application is being executed.

If the content sharing event does occur, then in operation 705, the electronic device displays a list of contents mapped to the party's contact point. The content mapped to the party's contact point is a content stored in the memory 130 of the electronic device or the server 106. For example, as shown in FIG. 8B, if the menu 831 for sharing the content with party 821 is selected by a user in the messenger application 811, the electronic device 800 displays a list of contents 851 mapped to the contact point for the party 821. The electronic device 800 may sort the content list 851 on the basis of a time at which the content is mapped. Alternatively or additionally, the electronic device 800 may display the content list 851 by grouping the content for by content type (e.g., a video, an image, a text, an audio, etc.).

In operation 707, the electronic device determines a content to be shared with a party. For example, as shown in FIG. 8D, electronic device 800 determines a content 861 selected by a user as the content to be shared with the party 821. The electronic device 800 may determine a plurality of contents selected by the user as the content to be shared with the party 821.

In operation 709, the electronic device shares the content with the party. For example, as shown in FIG. 8E, electronic device 800 provides content 861 selected by the user to party 821.

Figure 9:
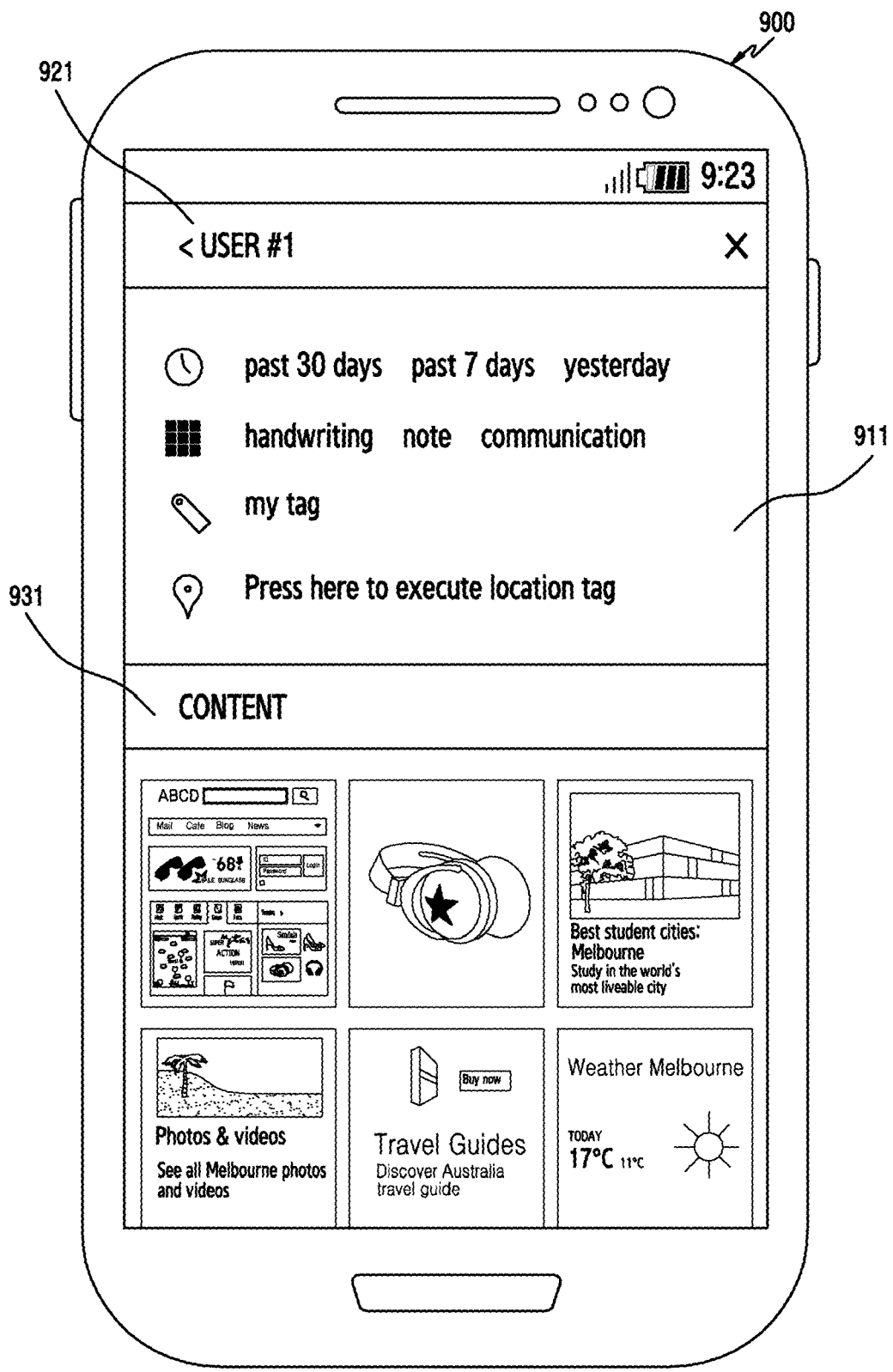
FIG. 9 illustrates a screen configuration for providing a content mapped to a contact point through a search service in an electronic device, according to an embodiment of the present disclosure.

FIG. 9 illustrates a screen configuration for providing a content mapped to a contact point through a search service in an electronic device, according to an embodiment of the present disclosure.

Referring to FIG. 9, a screen configuration for searching for contents stored in a contact point in electronic device 900 is provided. The electronic device 900 may execute a searching application (or service) 911. If at least one of the contents stored in a contact point 921 matches a search keyword which is input when a search service is provided, electronic device 900 displays a content list 931 mapped to the contact point 921 which match the search keyword.

If one of the contents included in the content list 931 is selected, the electronic device 900 determines an application for sharing the selected content with a party associated with the contact point 921.

Figure 10:
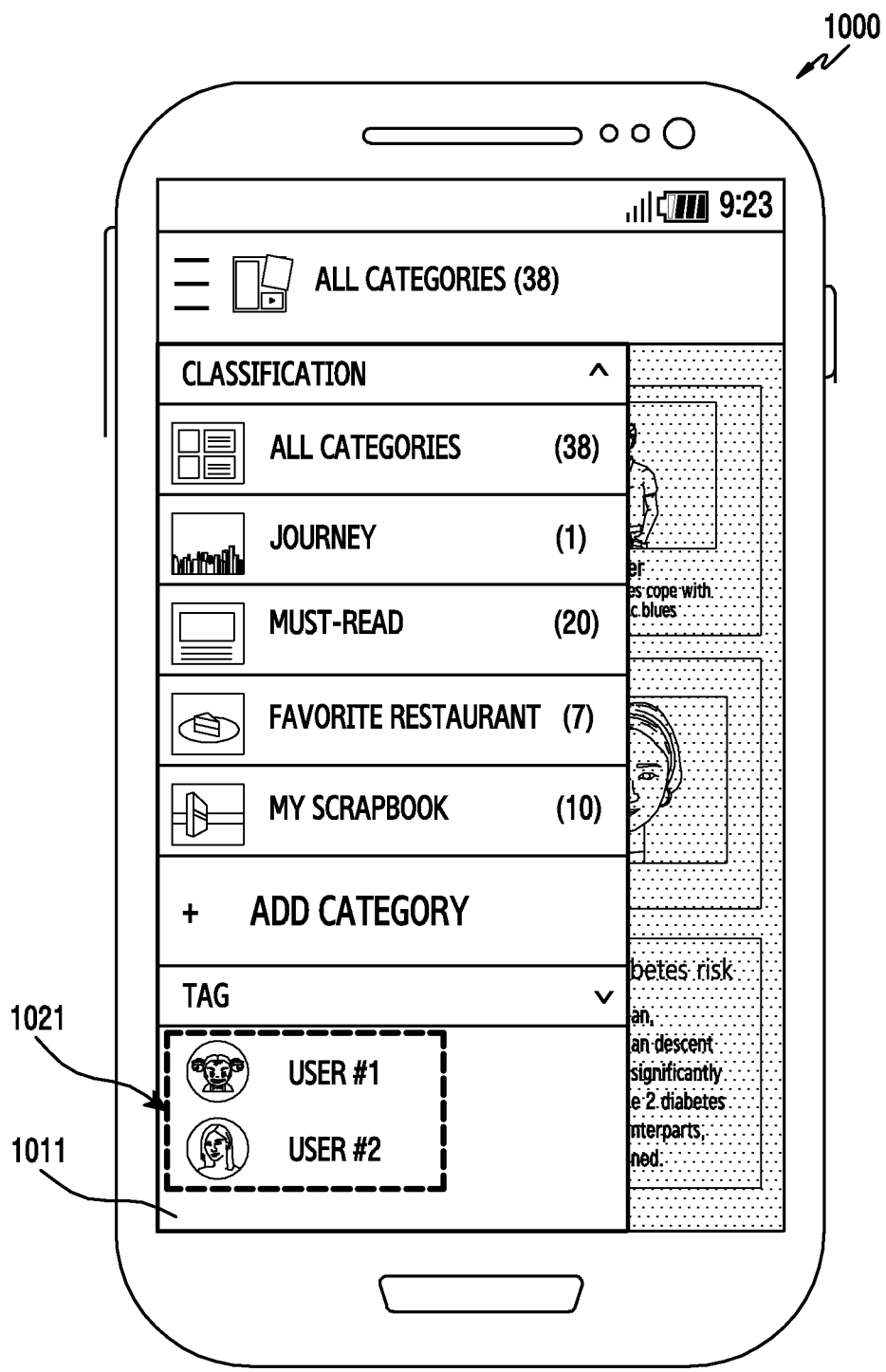
FIG. 10 illustrates a screen configuration for determining whether a content and a contact point are mapped using a content integrated management program in an electronic device, according to an embodiment of the present disclosure.

FIG. 10 illustrates a screen configuration for determining whether a content and a contact point are mapped using a content integrated management program in an electronic device, according to an embodiment of the present disclosure.

Referring to FIG. 10, an electronic device 1000 provides a content integrated management program 1011.

The content integrated management program 1011 is a program for managing mapped contents stored in the electronic device 1000. Mapped contents stored in the electronic device 1000 may be classified by category (e.g., a journey, a must-read, a famous restaurant, my scrapbook, etc.). The content integrated management program 1011 provides mapped contents stored in the electronic device 1000 by category classifications The electronic device 1000 additionally provides contact points 1021 to which the content is mapped in the content integrated management program 1011.

Figure 11:
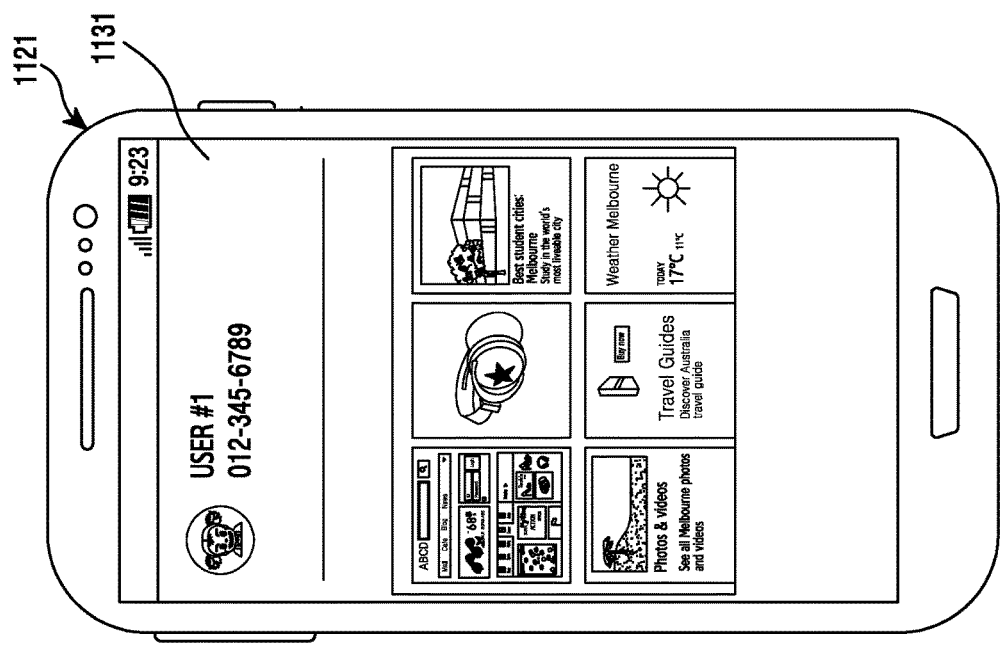
FIG. 11 illustrates a screen configuration for providing a content mapped to a contact point in an electronic device, according to an embodiment of the present disclosure.
Figure 11:
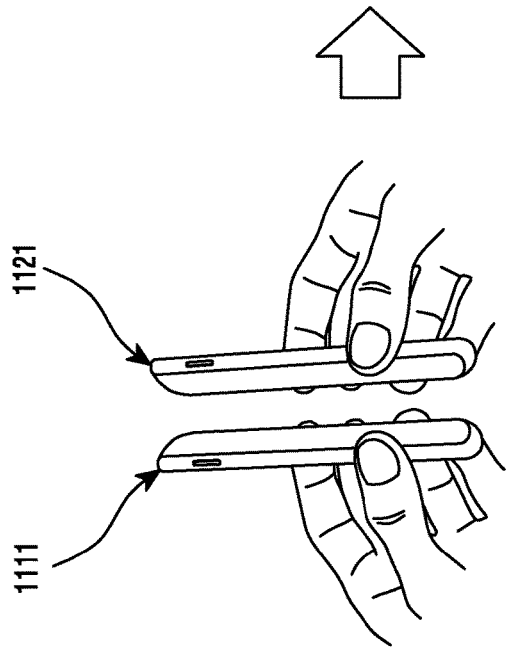

If one of the contact points 1021 to which the content is mapped is selected, the electronic device 1000 displays contents mapped to the selected contact point. FIG. 11 illustrates a screen configuration for providing a content mapped to a contact point in an electronic device, according to an embodiment of the present disclosure. Referring to FIG. 11, if Near Field Communication (NFC) tagging is performed with respect to a peer electronic device 1121, an electronic device 1111 displays a list of contents 1131 mapped to a contact point of the peer electronic device 1121.

For example, the electronic device 1111 provides to the peer electronic device 1121 a content selected by a user from among the list of contents 1131 mapped to the contact point of the peer electronic device 1121.

Alternatively, the electronic device 1111 provides the peer electronic device 1121 with a list of the contents 1131 mapped to the contact point of the peer electronic device 1121 and provides the peer electronic device 1121 with a corresponding content on the basis of a selection of content by the peer electronic device 1121.

Although it is described in the aforementioned embodiment that the electronic device provides contents mapped to a contact point by performing NFC tagging with respect to a peer electronic device, the present disclosure is not limited thereto. Accordingly, the electronic device may provide the content mapped to the contact point of the peer electronic device through short distance wireless communication, e.g., Wi-Fi Direct, Zigbee, and Bluetooth, with respect to the peer electronic device.

Figure 12:
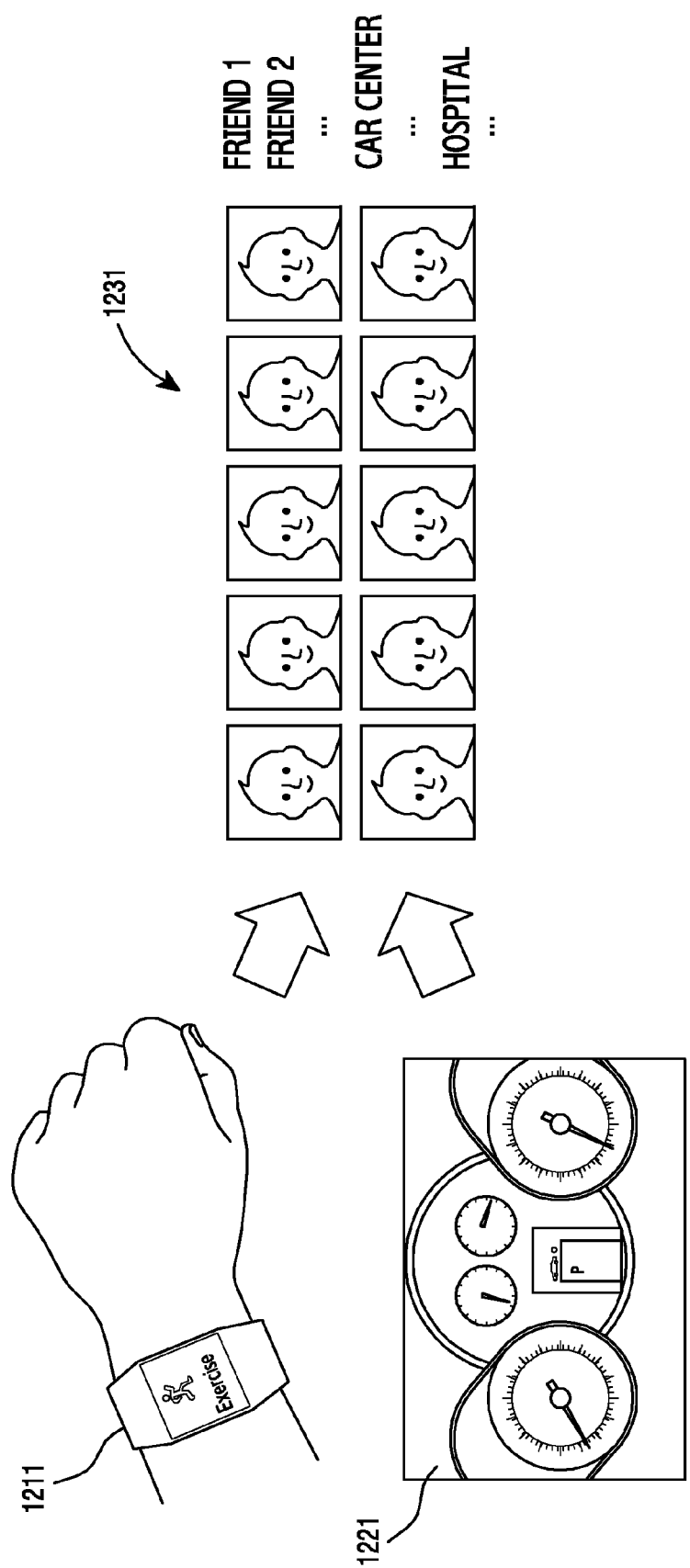
FIG. 12 illustrates a configuration for mapping a content, provided from an external electronic device connected to an electronic device, to a contact point in the electronic device, according to an embodiment of the present disclosure.

FIG. 12 illustrates a configuration for mapping a content, provided from an external electronic device connected to an electronic device, to a contact point in the electronic device, according to an embodiment of the present disclosure. Referring to FIG. 12, the electronic device maps a content related to a user's health information (e.g., a body temperature, a heart rate, an exercise amount, a blood sugar level, etc.) to a hospital contact point included in a contact list 1231 of the electronic device. The content related to the user's health information may be provided through the use of a first external electronic device 1211 (e.g., a smart watch).

The electronic device maps a content related to car state information (e.g., a battery residual value, a fuel residual value, a movement distance, a tire pressure, etc.) to a car center contact point included in the contact list 1231. The content related to the car state information may be provided through a second external electronic device 1221 (e.g., a smart car).

Figure 13:
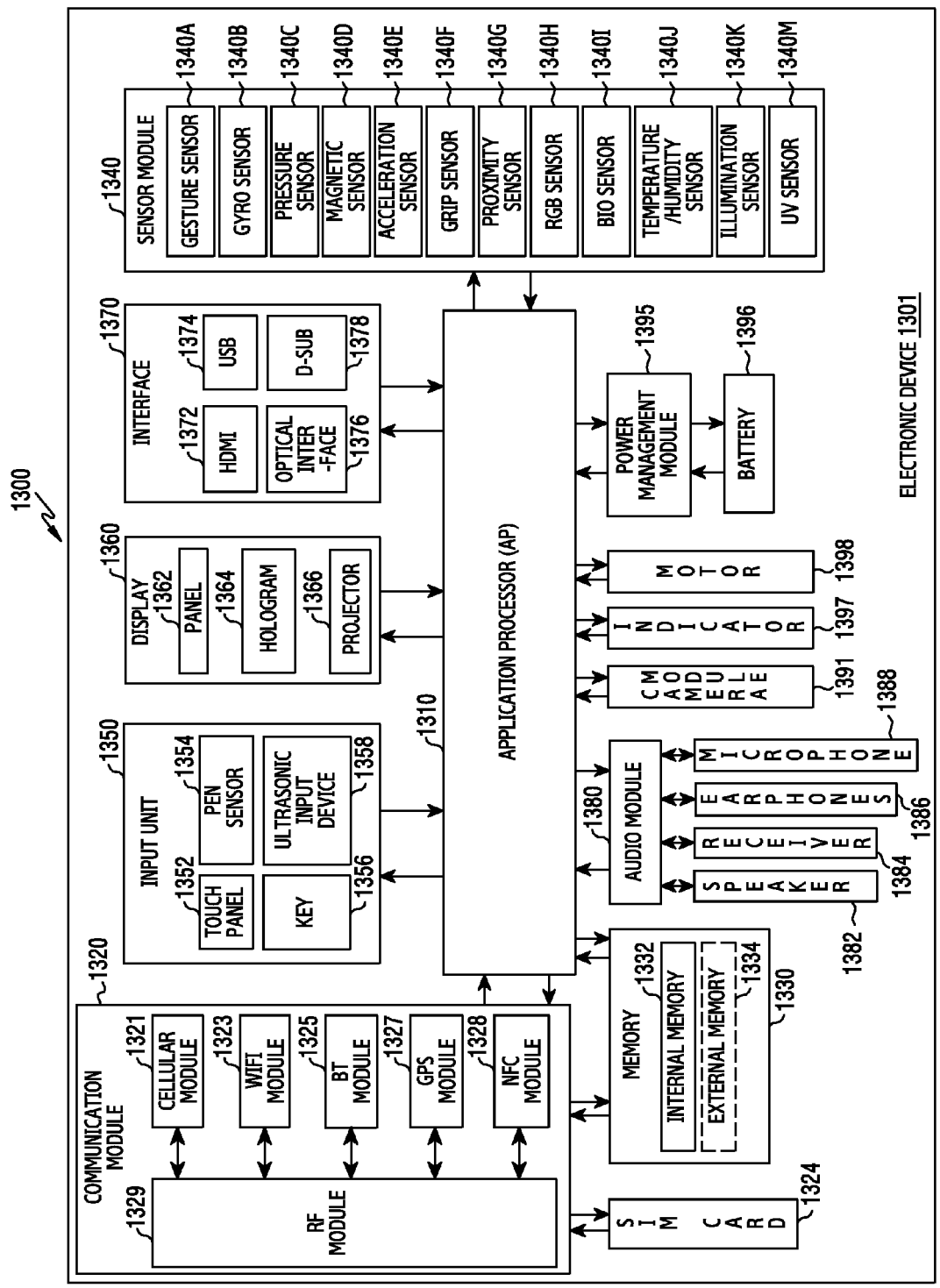
FIG. 13 is a block diagram of an electronic device, according to an embodiment of the present disclosure.

FIG. 13 is a block diagram of an electronic device, according to an embodiment of the present disclosure. The electronic device 1301 may, for example, constitute all or a part of the electronic device 100 shown in FIG. 1.

Referring to FIG. 13, the electronic device 1301 includes at least one Application Processor (AP) 1310, a communication module 1320, a Subscriber Identification Module (SIM) card 1324, a memory 1330, a sensor module 1340, an input unit 1350, a display 1360, an interface 1370, an audio module 1380, a camera module 1391, a power management module 1395, a battery 1396, an indicator 1397, or and a motor 1398.

The AP 1310 controls a plurality of hardware or software components connected to the AP 1310 by driving an operating system or an application program and performs processing of various pieces of data including multimedia data and calculations. The AP 1310 may, for example, be implemented by a system on chip (SoC). The AP 1310 may further include a Graphic Processing Unit (GPU).

The communication module 1320 transmits and receives data in communication between the electronic device 1301 and other electronic devices (for example, the electronic device 104 or the server 106) connected thereto through a network. The communication module 1320 includes a cellular module 1321, a Wi-Fi module 1323, a BT module 1325, a GPS module 1327, an NFC module 1328, and a Radio Frequency (RF) module 1329.

The cellular module 1321 provides a voice call, a video call, a text message service, or an Internet service through a communication network (for example, Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM)). Further, the cellular module 1321 may perform identification and authentication of electronic devices in a communication network using, for example, the SIM card 1324. The cellular module 1321 may perform at least some functions which the AP 1310 provides. For example, the cellular module 1321 may perform at least some of the multimedia control functions.

The cellular module 1321 may include a Communication Processor (CP). Furthermore, the cellular module 1321 may be implemented by an SoC. Although the components such as the cellular module 1321 (for example, a communication processor), the memory 1330, and the power management module 1395 are illustrated as components separate from the AP 1310 in FIG. 13, the AP 1310 may include at least some of the aforementioned components (for example, the cellular module 1321).

The AP 1310 or the cellular module 1321 (for example, the communication processor) loads a command or data received from at least one of a non-volatile memory and other components connected thereto in a volatile memory, and processes the loaded command or data. Furthermore, the AP 1310 or the cellular module 1321 stores data received from or generated by at least one of other elements in a non-volatile memory.

Each of the Wi-Fi module 1323, the BT module 1325, the GPS module 1327, and the NFC module 1328 may include, for example, a processor for processing data transmitted/received through the corresponding module. Although the cellular module 1321, the Wi-Fi module 1323, the BT module 1325, the GPS module 1327, and the NFC module 1328 are illustrated as separate blocks in FIG. 13, at least some (for example, two or more) of the cellular module 1321, the Wi-Fi module 1323, the BT module 1325, the GPS module 1327, and the NFC module 1328 may be included in one Integrated Chip (IC) or one IC package. For example, at least some (for example, the communication processor corresponding to the cellular module 1321 and the Wi-Fi processor corresponding to the Wi-Fi module 1323) of the processors corresponding to the cellular module 1321, the Wi-Fi module 1323, the BT module 13257, the GPS module 13278, and the NFC module 1328 may be implemented as one SoC.

The RF module 1329 transmits/receives data, for example, an RF signal. The RF module 1329 may include, for example, a transceiver, a Power Amp Module (PAM), a frequency filter, a Low Noise Amplifier (LNA), etc. Further, the RF module 1329 may further include a component for transmitting/receiving electronic waves over a free air space in wireless communication, for example, a conductor, a conducting wire or the like. Although the cellular module 1321, the Wi-Fi module 1323, the BT module 1325, the GPS module 1327, and the NFC module 1328 share one RF module 729 in FIG. 13, at least one of the cellular module 1321, the Wi-Fi module 1323, the BT module 1325, the GPS module 1327, or and the NFC module 1328 may transmit/receive an RF signal through a separate RF module.

The SIM card 1324 is a card that may be inserted into a slot formed in a particular portion of the electronic device 1301. The SIM card 1324 includes unique identification information (for example, an Integrated Circuit Card IDentifier (ICCID)) or subscriber information (for example, an International Mobile Subscriber IDentity (IMSI)).

The memory 1330 (for example, the memory 130) includes an internal memory 1332 or an external memory 1334.

The internal memory 1332 includes at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, etc.). The internal memory 1332 may be a Solid State Drive (SSD).

The external memory 1334 includes a flash drive, for example, a Compact Flash (CF), a Secure Digital (SD), a Micro Secure Digital (Micro-SD), a Mini Secure Digital (Mini-SD), an extreme Digital (xD), a memory stick, etc. The external memory 1334 may be functionally connected with the electronic device 1301 through various interfaces. The electronic device 1301 may further include a storage device (or a storage medium), such as a hard disc drive.

The sensor module 1340 measures a physical quantity or detects an operation state of the electronic device 1301, and converts the measured or detected information to an electrical signal. The sensor module 1340 includes at least one of, for example, a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (for example, a Red/Green/Blue (RGB) sensor), a biometric sensor 1340I, a temperature/humidity sensor 1340J, an illumination sensor 1340K, and an Ultra Violet (UV) sensor 1340M. Additionally or alternatively, the sensor module 1340 may include, for example, an E-nose sensor, an electromyography (EMG) sensor, an electroencephalogram (EEG) sensor, an electrocardiogram (ECG) sensor, an Infrared (IR) sensor, an iris sensor, and a fingerprint sensor. The sensor module 1340 may further include a control circuit for controlling one or more sensors included in the sensor module.

The input unit 1350 includes a touch panel 1352, a (digital) pen sensor 1354, a key 1356, or an ultrasonic input device 1358.

The touch panel 1352 recognizes a touch input through at least one of, for example, a capacitive type, a resistive type, an infrared type, and an ultrasonic type. The touch panel 1352 may further include a control circuit. A capacitive touch panel recognizes a physical contact or proximity. The touch panel 1352 may further include a tactile layer. In this case, the touch panel 1352 provides a tactile reaction to the user.

The (digital) pen sensor 1354 is implemented, for example, using the same or similar method to receiving a user's touch input or using a separate recognition sheet.

The key 1356 includes, for example, a physical button, an optical key, or a keypad.

The ultrasonic input device 1358 identifies data by detecting an acoustic wave with a microphone (for example, a microphone 1388) of the electronic device 1301 through an input unit generating an ultrasonic signal, and may perform wireless recognition.

The electronic device 1301 may additionally receive a user input from an external device (for example, a computer or server) connected thereto using the communication module 1320.

The display 1360 includes a panel 1362, a hologram device 1364 or a projector 1366.

The panel 1362 is, for example, a Liquid Crystal Display (LCD), Active-Matrix Organic Light Emitting Diode (AM-OLED), etc. The panel 1362 may be implemented to be, for example, flexible, transparent, or wearable. The panel 1362 may be configured as one module together with the touch panel 1352.

The hologram device 1364 displays a stereoscopic image in the air by using an interference of light.

The projector 1366 projects light onto a screen to display an image. The screen may be located, for example, inside or outside the electronic device 1301.

The display 1360 may further include a control circuit for controlling the panel 1362, the hologram device 1364, and the projector 1366.

The interface 1370 includes, for example, a High-Definition Multimedia Interface (HDMI) 1372, a Universal Serial Bus (USB) 1374, an optical interface 1376, or a D-subminiature (D-sub) 1378. The interface 1370 may be included in, for example, the communication interface 160, illustrated in FIG. 1. Additionally or alternatively, the interface 1370 may include, for example, a Mobile High-definition Link (MHL) interface, a Secure Digital (SD) card/Multi-Media Card (MMC) interface, or an Infrared Data Association (IrDA) standard interface.

The audio module 1380 bilaterally converts a sound and an electrical signal. The audio module 1380 processes sound information input or output through, for example, a speaker 1382, a receiver 1384, earphones 1386, and the microphone 1388.

The camera module 1391 is a device for capturing a still image or a video, may include one or more image sensors (for example, a front sensor or a rear sensor), a lens, an Image Signal Processor (ISP), or a flash (for example, an LED or xenon lamp).

The power management module 1395 manages power of the electronic device 1301. The power management module 1395 may include, for example, a Power Management Integrated Circuit (PMIC), a charger Integrated Circuit (IC), and a battery gauge. The PMIC may be mounted to, for example, an integrated circuit or an SoC semiconductor.

Charging methods may be classified into a wired charging method and a wireless charging method. The charger IC charges a battery and prevents over voltage or over current from a charger. The charger IC includes a charger IC for at least one of the wired charging method or and the wireless charging method. Examples of the wireless charging may include magnetic resonance charging, magnetic induction charging, and electromagnetic charging, and an additional circuit, such as a coil loop, a resonance circuit, and a rectifier may be added for the wireless charging.

The battery gauge measures, for example, a remaining quantity of the battery 1396, or a voltage, a current, or a temperature during charging. The battery 1396 stores or generates electricity, and supplies power to the electronic device 1301 using the stored or generated electricity. The battery 1396 may include, for example, a rechargeable battery or a solar battery.

The indicator 1397 displays a specific status of the electronic device 1301 or part (for example, the AP 1310) of electronic device 1301, for example, a booting status, a message status, a charging status, etc.

The motor 1398 converts an electrical signal to a mechanical vibration.

The electronic device 1301 may include a processing unit (for example, a GPU) for supporting mobile TV. The processing unit for supporting mobile TV processes media data according to a standard of Digital Multimedia Broadcasting (DMB), Digital Video Broadcasting (DVB), media flow, etc.

The above described components of the electronic device according to various embodiments of the present disclosure may be formed of one or more components, and a name of a corresponding component element may be changed based on the type of electronic device. The electronic device may include one or more of the aforementioned components or may further include other additional components, or some of the aforementioned components may be omitted. Further, some of the components of the electronic device may be combined to form a single entity, and thus, may equivalently execute functions of the corresponding elements prior to the combination.

The term "module" as used herein may refer to, for example, a "unit" including one of hardware, software, and firmware, or a combination of two or more of the hardware, software, and firmware. The "module" may be interchangeably used with a term, such as "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least some of the devices (for example, modules or functions thereof) or the method (for example, operations) may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130. At least a part of the programming module may, for example, be implemented (e.g., executed) by the processor 120. At least some of the programming modules may include, for example, a module, a program, a routine, a set of instructions, or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, etc. In addition, the program instructions may include high-level language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to an embodiment of the present disclosure may include at least one of the described component elements, a few of the component elements may be omitted, or additional components may be included. Operations executed by a module, a programming module, or other component elements may be executed sequentially, in parallel, repeatedly, or in a heuristic manner. Further, some operations may be executed according to another order or may be omitted, or other operations may be added.

The embodiments of the present disclosure disclosed in the specification and the drawings are only particular examples proposed in order to easily describe the technical matters of the present disclosure and help with a comprehension of the present disclosure, and do not limit the scope of the present disclosure. Therefore, in addition to the embodiments disclosed herein, the present disclosure should be construed to include all modifications or modified forms drawn based on the technical idea of the various embodiments of the present disclosure. Therefore, the scope of the present disclosure is defined, not by the detailed description and embodiments, but by the following claims and their equivalents.

What is claimed is:

1. A method of operating an electronic device, the method comprising:
   displaying, via a display of the electronic device, content with a designated object;
   acquiring information regarding the content being displayed and displaying a contact list including at least one contact item corresponding to at least one contact which has been stored in a memory of the electronic device where the contact list is superimposed on the content, in response to detecting a first input on the designated object;
in response to detecting a second input for selecting a contact item among the at least one contact item, associating the information with a contact corresponding to the contact item among the at least one contact item;
storing association information for associating the information with the contact; and
in response to receiving an input for displaying a screen regarding the contact via a contact application, displaying, based on the association information, an object indicating the content within the screen regarding the contact via the contact application.

2. The method of claim 1, further comprising:
displaying, based on the association information, a preview image indicating the content within the display, in response to receiving an input for displaying a user interface (UI) of the contact application associated with the contact.

3. The method of claim 1, further comprising:
displaying, based on detecting an input regarding transmitting the content in a UI of a message application associated with the contact, a preview image regarding the content for transmitting to another electronic device corresponding to the contact.

4. The method of claim 1, further comprising:
displaying, based on detecting a text input for searching the contact in a UI of a search service application, a preview image regarding the content.

5. The method of claim 1, further comprising:
displaying a UI of a content management application with an object indicating the contact item, based on receiving an input for executing the content management application; and
displaying the content in response to detecting another input on the contact item displayed in the UI.

6. The method of claim 1,
wherein the contact item includes at least one of a phone number, a social networking service (SNS), identification (ID), and an e-mail address, and
wherein the content includes at least one of a video, an image, a text, audio, and application data.

7. The method of claim 1, further comprising:
acquiring at least one of storage location information of the content, type information of the content, or application information for providing the content.

8. The method of claim 7, wherein the storage location information includes at least one of a storage path of the memory of the electronic device in which the content is stored and a uniform resource locator (URL) at which the content is stored.

9. The method of claim 1, further comprising:
detecting the second input for selecting the contact item and a third input for selecting another contact item based on the displaying the contact list;
associating the information with the contact corresponding to the contact item and the another contact corresponding to the another contact item among the at least one contact, in response to detecting the second input and the third input; and
storing first association information on the contact and second association information on the another contact.

10. An electronic device comprising:
a display;
a memory storing instructions; and
a processor, coupled to the display and the memory, configured to execute the instructions to:
display, via the display, content with a designated object;
in response to detecting a first input on the designated object, acquire information regarding the content being displayed and display a contact list including at least one contact item corresponding to at least one contact which has been stored in the memory of the electronic device where the contact list is superimposed on the content;
in response to detecting a second input for selecting a contact item among the at least one contact item, associate the information with a contact corresponding to the contact item among the at least one contact;
store association information for associating the information with the contact; and
in response to receiving an input for displaying a screen regarding the contact via a contact application, display, based on the association information, an object indicating the content within the screen regarding the contact via the contact application.

11. The electronic device of claim 10, wherein the processor is further configured to execute the instructions to:
display, based on the association information, a preview image indicating the content within the display, in response to receiving an input for displaying a user interface (UI) of a contact application associated with the contact.

12. The electronic device of claim 10, wherein the processor is further configured to execute the instructions to:
display, based on detecting an input regarding transmitting the content in a UI of a message application associated with the contact, a preview image regarding the content for transmitting to another electronic device corresponding to the contact.

13. The electronic device of claim 10, wherein the processor is further configured to execute the instructions to:
display, based on detecting a text input for searching the contact in a UI of a search service application, a preview image regarding the content.

14. The electronic device of claim 10, wherein the processor is further configured to execute the instructions to:
display a UI of the content management application with an object indicating the contact item, based on receiving an input for executing the content management application; and
display the content in response to detecting another input on the contact item displayed in the UI.

15. The electronic device of claim 10, wherein the contact item includes at least one of a phone number, a social networking service (SNS), identification (ID), and an e-mail address, and
wherein the content comprises at least one of a video, an image, a text, audio, and application data.

16. The electronic device of claim 10, wherein the processor is further configured to execute the instructions to:
acquiring at least one of storage location information of the content, type information of the content, or application information for providing the content.

17. The electronic device of claim 16, wherein the storage location information includes at least one of a storage path of the memory of the electronic device in which the content is stored and a uniform resource locator (URL) at which the content is stored.

18. The electronic device of claim 10, wherein the processor is further configured to execute the instructions to:

detect the second input for selecting the contact item and a third input for selecting another contact item based on the displaying the contact list;

associate the information with the contact corresponding to the contact item and the another contact corresponding to the another contact item among the at least one contact in response to detecting the second input and the third input; and storing first association information on the contact and second association information on the another contact.

19. A non-transitory computer-readable storage medium for storing one or more programs for executing a method of:

displaying, via a display of the electronic device, content with a designated object;

acquiring information regarding the content being displayed and displaying a contact list including at least one contact item corresponding to at least one contact which has been stored in a memory of the electronic device where the contact list is superimposed on the content, in response to detecting a first input on the designated object;

in response to detecting a second input for selecting a contact item among the at least one contact item, associating the information with a contact corresponding to the contact item among the at least one contact;

storing association information for associating the information with the contact; and in response to receiving an input for displaying a screen regarding the contact via a contact application, displaying, based on the association information, an object indicating the content within the screen regarding the contact via the contact application.

* * * * *